(12) United States Patent
Porter et al.

(10) Patent No.: US 7,316,242 B2
(45) Date of Patent: Jan. 8, 2008

(54) HYDROGEN STORAGE SYSTEM AND METHOD OF OPERATION THEREOF

(75) Inventors: Stephen Charles Porter, Burlington, CT (US); Mark Andrew Lillis, South Windsor, CT (US); Dean Edwin Halter, West Hartford, CT (US); Iris Liane Shiroma, Rocky Hill, CT (US); Spyros Nomikos, Plantation, FL (US)

(73) Assignee: Proton Energy Systems, Inc, Wallingford, CT (US)

( * ) Notice: Subject to any disclaimer, the term of this patent is extended or adjusted under 35 U.S.C. 154(b) by 340 days.

(21) Appl. No.: 10/708,992

(22) Filed: Apr. 6, 2004

(65) Prior Publication Data

US 2005/0178432 A1    Aug. 18, 2005

Related U.S. Application Data

(63) Continuation-in-part of application No. 10/708,165, filed on Feb. 12, 2004.

(51) Int. Cl.
*F17D 1/04*    (2006.01)

(52) U.S. Cl. ...................... 137/255; 137/266

(58) Field of Classification Search ............... 137/255, 137/256, 263, 266
See application file for complete search history.

(56) References Cited

U.S. PATENT DOCUMENTS

| | | | |
|---|---|---|---|
| 2,547,823 A * | 4/1951 | Josephian | ................... 137/266 |
| 4,100,051 A | 7/1978 | Kilby et al. | |
| 4,341,607 A | 7/1982 | Tison | |
| 4,380,242 A | 4/1983 | Bresie et al. | |
| 4,778,579 A | 10/1988 | Levy et al. | |
| 4,883,724 A | 11/1989 | Yamamoto | |
| 5,323,752 A | 6/1994 | Von Herrmann et al. | |
| 5,360,679 A | 11/1994 | Buswell et al. | |
| 5,376,470 A | 12/1994 | Sprouse | |
| 5,401,589 A | 3/1995 | Palmer et al. | |
| 5,506,066 A | 4/1996 | Sprouse | |
| 5,884,675 A | 3/1999 | Krasnov | |
| 6,134,124 A | 10/2000 | Jungreis et al. | |
| 6,184,593 B1 | 2/2001 | Jungreis | |
| 6,329,091 B1 | 12/2001 | James | |
| 6,459,231 B1 | 10/2002 | Kagatani | |
| 6,555,989 B1 | 4/2003 | Pearson | |
| 6,611,068 B2 | 8/2003 | Craty | |
| 6,628,011 B2 | 9/2003 | Droppo et al. | |
| 2003/0062268 A1 | 4/2003 | Kosek et al. | |
| 2003/0113595 A1 | 6/2003 | Jungreis | |

(Continued)

FOREIGN PATENT DOCUMENTS

EP    0 255 003 A2    3/1998

(Continued)

*Primary Examiner*—Kevin Lee
(74) *Attorney, Agent, or Firm*—Cantor Colburn LLP

(57) ABSTRACT

A regenerative fuel cell system is provided having at least one hydrogen storage container fluidly coupled to at least one hydrogen generator and at least one power generator. Each power generator further includes a fuel cell fluidly coupled to the hydrogen storage container, an electric energy storage device, and an unregulated dc bus electrically connected to said fuel cell and said electric storage device. The system further provides for a health monitoring system for determining the occurrence of critical events which may necessitate the disabling of the system.

8 Claims, 18 Drawing Sheets

U.S. PATENT DOCUMENTS

2003/0230495 A1    12/2003    Anderson et al.
2004/0009380 A1    1/2004    Pearson

FOREIGN PATENT DOCUMENTS

| | | |
|---|---|---|
| EP | 1 146 277 A1 | 10/2001 |
| EP | 1 398 603 A2 | 3/2004 |
| FR | 2 841 890 A1 | 1/2004 |
| JP | 08306379 A | 11/1996 |
| JP | 2001258390 A | 9/2001 |
| WO | WO-02/10877 A2 | 2/2002 |
| WO | WO-03/098730 A2 | 11/2003 |

* cited by examiner

HYDROGEN STORAGE SYSTEM AND METHOD OF OPERATION THEREOF

CROSS REFERENCE TO RELATED APPLICATIONS

This application is a continuation in part and claims the benefits of Regenerative Fuel Cell System and Method of Operation Thereof application Ser. No. 10/708,165 filed Feb. 12, 2004, the entire contents of which are incorporated herein by reference.

FIELD OF INVENTION

The present invention relates to a regenerative fuel cell power generation system, and in particular to a system having multiple fuel cell and electrolysis cell modules of different configurations.

BACKGROUND OF THE INVENTION

Regenerative fuel cell systems provide a reversible electrochemical process for using electricity to convert water into hydrogen and oxygen and then reversing the process to combine the hydrogen and oxygen to create electricity. Typically, these systems have a membrane electrode assembly ("MEA") that includes an ion conducting polymer membrane sandwiched between two electrodes containing a catalyst material. In fuel generation, or electrolysis mode, the electrical current is passed through the electrodes, causing the water in contact with the anode catalyst to decompose into its base elements of hydrogen and oxygen. Due to the unique characteristics of the polymer membrane, hydrogen ions are driven by the electrical current to the opposite cathode electrode where in the presence of the second catalyst, the hydrogen ions recombine with electrons to form hydrogen gas. In electrical generation, or fuel cell mode, the process is reversed. Hydrogen gas is introduced to the cathode electrode that decomposes the hydrogen into a hydrogen ion and an electron. The hydrogen ion passes through the polymer membrane and combines with oxygen to form water at the anode electrode. Regenerative fuel cell systems are commonly divided into two categories: unitized regenerative fuel cells and discrete regenerative fuel cells.

In a unitized regenerative fuel cell system ("URFC"), a single electrochemical cell used to generate both the hydrogen gas and the electricity using the same MEA. This type of system has several advantages in that a single component can be used for both generating modes, leading a smaller lighter system. However, since the process must be completely reversible within the component, neither of the electrodes can be optimized for a particular generation mode resulting in efficiency losses. Due to efficiency issues and cost considerations, URFC"s are typically limited to aerospace or geographically remote applications where the size and weight parameters are paramount.

In contrast to the URFC, a discrete regenerative fuel cell ("DRFC") system is designed to utilize two electrochemical cell components: an electrolysis cell for generating hydrogen; and a fuel cell for generating electricity. By dividing the generation modes between two components each of the individual cell components can be optimized for its particular purpose. This leads to a more efficient and cost effective solution than can be currently accomplished with a URFC. Applications for the DRFC include backup or emergency power systems for buildings or telecommunications facilities such as cellular phone towers.

What is needed in the art is a cost effective and efficient regenerative fuel cell system that is adaptable to the changing needs of an application and which provides a greater degree of independent operation than had been previously available.

SUMMARY OF INVENTION

In one aspect of the invention, a method for operating a high pressure gas storage system includes the steps of opening a first valve on a first high pressure gas storage container. Releasing gas from the first storage container and closing the first valve in response to a predetermined operating parameter. Opening a second valve on a second high pressure gas storage container and releasing gas from the second storage container. Then finally closing the second valve in response to the predetermined operating parameter. The process may optionally be repeated for each container in the gas storage system until the gas is depleted from the storage system.

In another aspect of the invention, a high pressure gas storage system includes a plurality of storage tank groups fluidly coupled to each other. Each of the plurality of storage tank groups has at least a first and second gas storage container fluidly coupled together and a valve fluidly coupled to the first and second storage container wherein when the valve is closed, said first and second gas containers are fluidly isolated from the other storage tank groups.

In another aspect of the invention, a method for determining the individual pressure level of a gas storage container in a gas pressure storage system, when it is coupled to a plurality of gas storage containers utilizing a single pressure transducer includes the steps of closing the valves to all gas storage containers. Opening the valve to a first gas storage container to allow gas to enter a first conduit. Measuring the gas pressure in the first conduit. Closing the valve to the first storage container. Then opening a valve to vent the gas from said conduit and closing the valve to the vent.

In another aspect of the invention, a high pressure gas storage system includes a plurality of storage tank groups fluidly coupled to each other. Each of the plurality of storage tank groups having at least a first and second gas storage container fluidly coupled together and a valve fluidly coupled to the first and second storage container wherein when the valve is closed, the first and second gas containers are fluidly isolated from the other storage tank groups. The plurality of storage tank groups may optionally be fluidly connected to a pressure regulator by a first conduit and have a pressure transducer coupled to the first conduit between the pressure regulator and the plurality of storage tank groups.

In another aspect of the invention, a method for determining the individual pressure level of a gas storage container in a gas pressure storage system, when it is coupled to a plurality of gas storage containers utilizing a single pressure transducer includes the steps of closing the valves to all gas storage containers. Opening the valve to a first gas storage container to allow gas to enter a first conduit. Measuring the gas pressure in the first conduit. Closing the valve to the first storage container. Opening a valve to vent the gas from the conduit and closing the valve to the vent. The process may optionally be repeated for each container in the gas storage system.

In another aspect of the invention, a method for determining the health of a valve which conducts gas in a high pressure gas storage system includes the steps of closing all tank valves in the system. Venting gas from a conduit connected to the tank valves with the conduit being fluidly coupled to the check valve. Closing a valve to the vent and opening at least one tank valve to pressurize the conduit. Closing the tank valve and, opening an input valve, the input valve being fluidly coupled to the valve opposite the conduit.

In an alternate embodiment of the invention, a method for determining the health of a valve which conducts gas in a high pressure gas storage system is provided including the steps of closing all tank valves in the system. Venting gas from a conduit connected to the tank valves, the conduit being fluidly coupled to the check valve. Closing a valve to the vent and opening at least one tank valve to pressurize the conduit. Closing the tank valve and opening an input valve, the input valve being fluidly coupled to the valve opposite the conduit. The invention may optionally further include the steps of measuring a first gas pressure at the input valve. Waiting a predetermined amount of time and measuring a second gas pressure after the predetermined amount of time. Then disabling the system if the difference between the first gas pressure and the second gas pressure exceeds a predetermined amount.

In another aspect of the invention, a method for determining the health of a first and second pressure transducer where each pressure transducer is located on either side of a pressure regulator includes the steps of measuring a first pressure of gas at a first pressure transducer. Measuring a second pressure of gas at a second pressure transducer, where said second pressure transducer is located downstream from the first pressure transducer and opposite a pressure regulator. Comparing the first pressure with the second pressure once the pressure at the first pressure transducer drops below a predetermined threshold. Creating a signal if the difference between the first pressure and the second pressure if greater than a predetermined amount.

In an alternate embodiment to the invention, a method for determining the health of a first and second pressure transducer where each pressure transducer is located on either side of a pressure regulator including the steps of measuring a first pressure of gas at a first pressure transducer. Measuring a second pressure of gas at a second pressure transducer, where the second pressure transducer is located downstream from the first pressure transducer and opposite a pressure regulator. Comparing the first pressure with the second pressure once the pressure at the first pressure transducer drops below a predetermined threshold. Then creating a signal if the difference between the first pressure and the second pressure if greater than a predetermined amount.

In yet another alternate embodiment, a method for determining the health of a pressure transducer while filling a gas storage system includes the steps of generating gas at a pressure. Measuring a first gas pressure at a first pressure transducer. Measuring a second gas pressure at a second pressure transducer and creating a signal if the difference between the first and second gas pressure is greater than a predetermined threshold.

The above discussed and other features will be appreciated and understood by those skilled in the art from the following detailed description and drawings.

BRIEF DESCRIPTION OF DRAWINGS

Referring now to the drawings, which are meant to be exemplary and not limiting, and wherein like elements are numbered alike.

DETAILED DESCRIPTION

Figure 1:
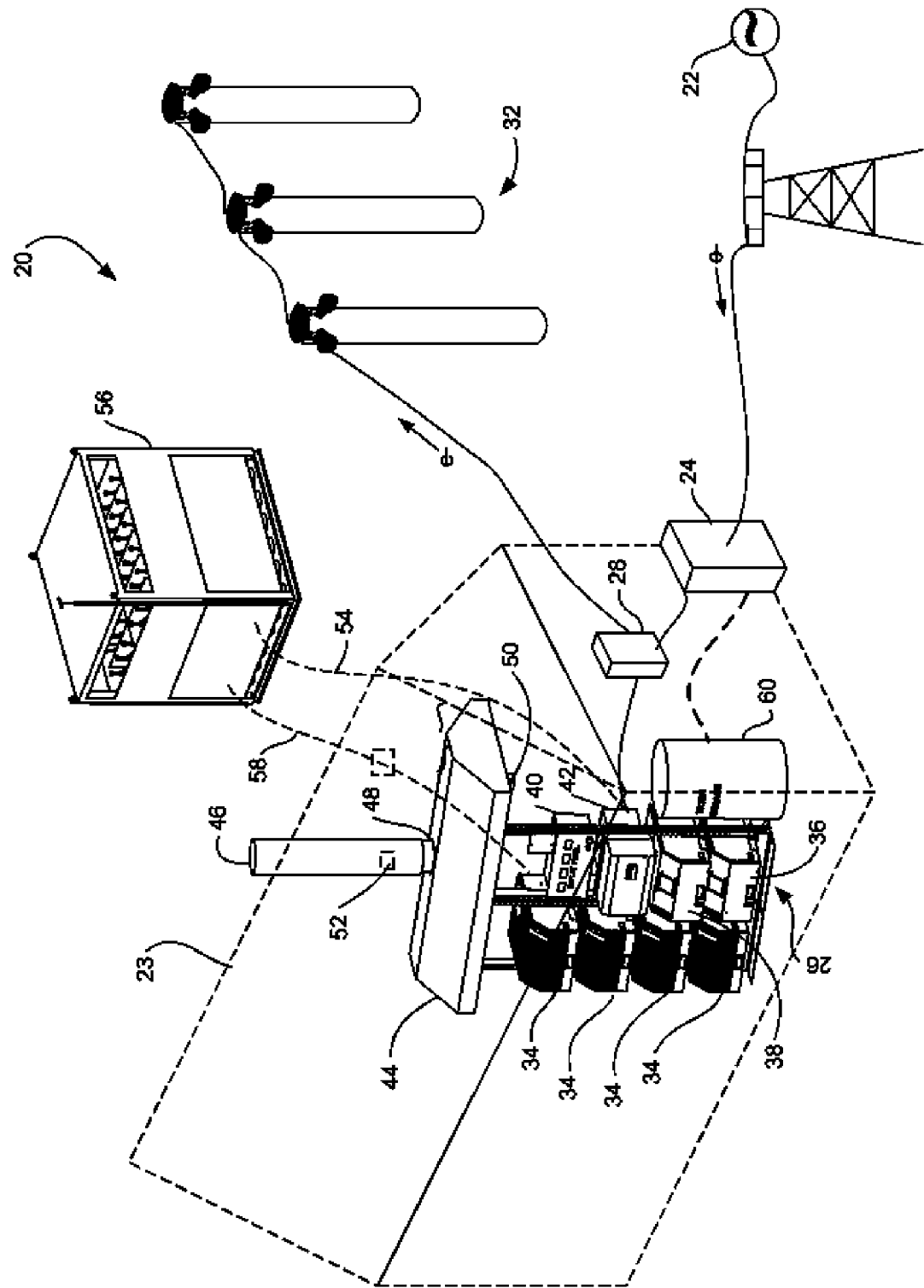
FIG. 1 is a perspective view illustration of the regenerative fuel cell system of the present invention.

As shown in FIG. 1, the regenerative fuel cell system 20 of the present invention receives power from an external source 22 through an electrical panel 24. The panel 24 divides the electricity with a portion of the electrical power being provided to the generating system 26 and the remainder being provided to a load center 28. The load center 28 transmits electrical power to a load 30, which is illustrated herein by a series of lights 32. The load center 28 also receives power from the generating system 26.

As will be described in more detail herein, the generating system 26 includes power generating modules 34, and hydrogen generators 36, 38. An interface module 40 provides the system operator a central interface for the system 20. Additionally, an inverter 42 converts DC electric power generated by the power generators 34 into AC power which is provided to the load center 28 in the event of a power failure by the external source 22. An optional water storage tank 60 provide water to the hydrogen generators 36, 38 and receives water recoverd by power generator 34.

A hood 44 is positioned above and adjacent to the generating system 26 to provide the appropriate level of ventilation to ensure that any combustible gases present remain at an appropriate level for operation. A conduit 46 containing a fan 48 draws air out of the hood 44 and exhaust the air to the environment. A combustible gas sensor 50 and a pressure switch 52 provide signals to the interface module on the operating conditions in the room. It should be noted that generation system 26 is illustrated FIG. 1 as being located within a building 23, however this is for example purposes only, the system may be housed within any suitable structure or cabinetry as appropriate for a given application.

The hydrogen generators 36, 38 provide hydrogen gas via conduit 54 to the hydrogen storage system 56. The hydrogen storage system 56 may include multiple containers for gas storage as described here, or may be a smaller number (including a single) of larger containers depending on the needs of the application and the availability of space. A conduit 58 returns hydrogen gas from storage system 56 for use by the power generating modules 34 in the event of an electrical power failure by external source 22.

Figure 2:
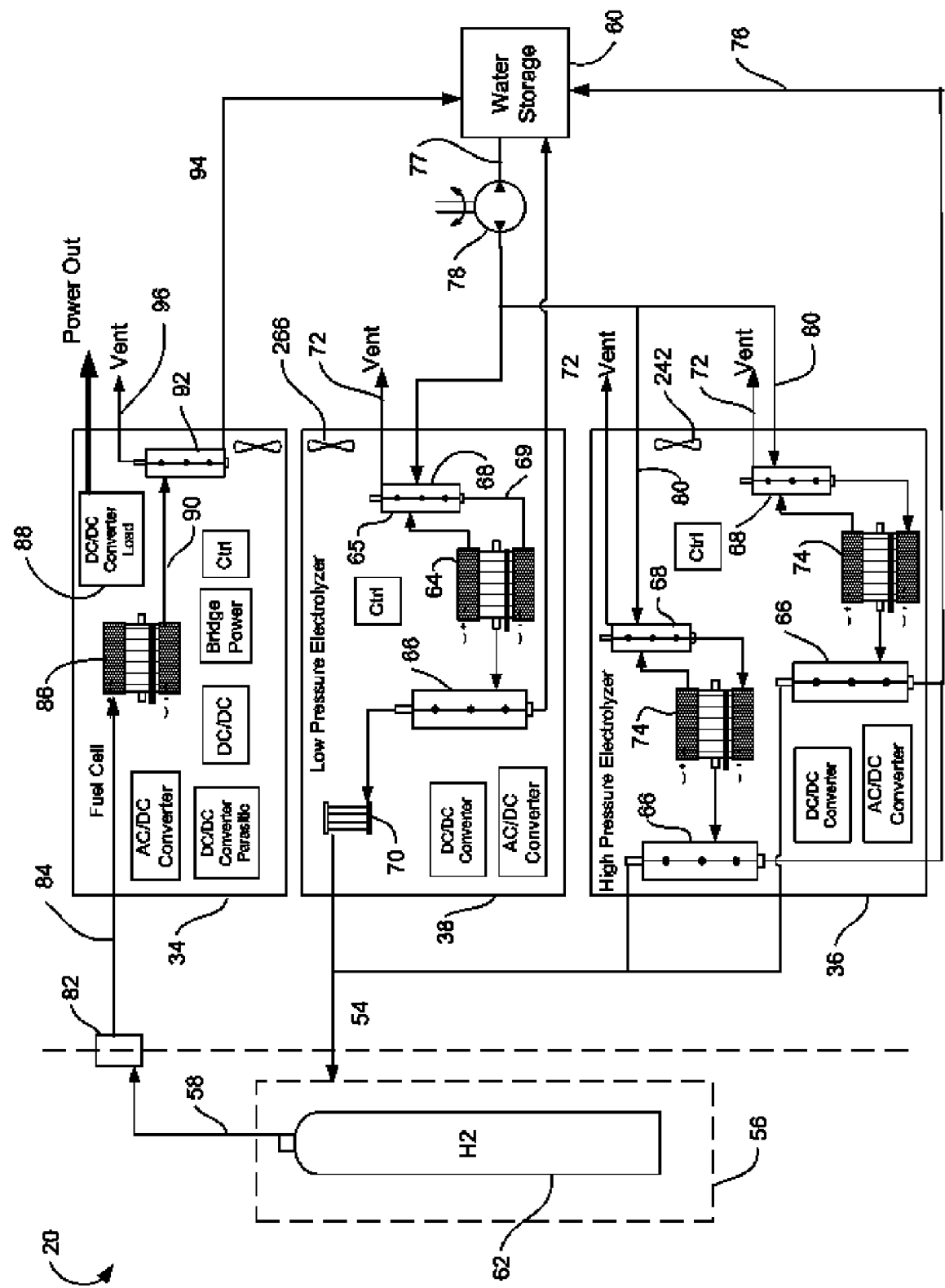
FIG. 2 is a schematic diagram illustrating the mechanical connections of the regenerative fuel cell system of FIG. 1.

A more detailed description of the mechanical interconnections of regenerative fuel cell system 20 is shown in FIG. 2. The hydrogen storage system 56 includes one or more containers 62 which are used to store the hydrogen gas. In the preferred embodiment, these containers 62 are typically steel tanks (such as a HP 300 series tank manufactured by the Worthington Corporation) having a working pressure of at least 2000 psi (13.8 MPa). Alternatively, a carbon composite tank (such as Model W150t120068 manufactured by DYNETEK Corporation) having a working pressure of at least 5000 psi (34.5 MPa) may be used. A described above, the containers are filled via conduit 54 which connects the hydrogen storage system with the hydrogen generators 36, 38. As will be described in more detail herein, the hydrogen generators contain electrochemical cells that disassociate hydrogen from water to form hydrogen gas. In the preferred embodiment, the lower pressure electrochemical hydrogen generator 38 includes a high volume, low pressure electrochemical cell 64 which generates a high volume hydrogen gas at lower pressure levels. The hydrogen generator 38 also includes ancillary equipment such as hydrogen-water phase separators 66, oxygen-water phase separators 68, and gas dryer 70. In the preferred embodiment, the hydrogen gas disassociated by the electrochemical cell 64 may have water entrained in the gas stream. Since it is desirable to store dry hydrogen gas, the hydrogen gas enters the phase separator 66 that removes most of the water from the gas. Water removed in the phase separator 66 is drained periodically and recovered for later reuse in the hydrogen generation process. After exiting the phase separator 66, the gas passes through a dryer 70, preferably a swing-bed type dryer containing a desiccant that removes a majority of the water still remaining in the hydrogen gas stream. Typically, the dryer 70 will include at least two dryer columns containing desiccant. During operation, hydrogen gas produced by the electrochemical cell 64 is passed through one of the dryer columns. After a predetermined period of time, the desiccant in the dryer column will be come saturated with water. The dryer 70 will the switch the hydrogen gas stream to the other dryer column to continue drying the produced hydrogen gas. In a typical swing-bed type dryer, a portion of the hydrogen gas is used to purge and reconstitute the saturated dryer bed. Optionally, if the rate of hydrogen production insufficient to purge and deliver simultaneously, the dryer 70 will divert all hydrogen gas produced through the saturate bed, until such time that the dryer purge cycle is complete, typically the time to purge is approximate ⅒ the production period. In the preferred embodiment, since the pressured needed for draining the phase separator 66 is lost due to the purging of the dryer 70, the hydrogen generator 36 drains the phase separator a predetermined amount of time prior to the dryer 70 switching between columns in order to prevent the phase separator 66 from flooding with water that would otherwise be due to an inadequately drained phase separator.

The electrochemical cell 64 is connected to the phase separator 68 by conduit 65. The phase separator 68 also provides additional functionality temporarily storing water prior to being transferred via conduit 69 to the electrochemical cell 64. The oxygen phase separator 68 may optionally include a vent conduit 72 for exhausting oxygen to the environment. In the preferred embodiment, the low pressure electrochemical generates hydrogen at a rate between 5 standard cubic feet per hour (scfh) and 80 scfh at a pressure between 20 psi and 400 psi. It should be appreciated that while the exemplary embodiments discussed herein discuss the use of a PEM electrochemical cell to disassociate hydrogen from water to generate the hydrogen gas, it is contemplated that the hydrogen generators may use other processes, such as hydrocarbon reformers or alkaline electrolysis cell.

A second hydrogen generator 36 is connected to conduit 54 in parallel with hydrogen generator 38. In the preferred embodiment, hydrogen generator 36 generate hydrogen at a higher pressure than generator 38, typically in the range of 1000 to 10,000 psi (6.9 MPa to 69 MPa), preferably hydrogen generator 38 produces hydrogen gas at 2400 psi (16.5 MPa). In the preferred embodiment, hydrogen generator 38 includes at least one, preferably two electrochemical cells 74. Hydrogen generator 36 also includes ancillary equipment such as hydrogen-water phase separators 66, oxygen-water phase separators 68, and gas dryer 70. The oxygen phase separator 68 may optionally include a vent conduit 72 for exhausting oxygen to the environment. In the preferred embodiment, the second hydrogen generator generates hydrogen at a rate between 100 standard cubic centimeters per minute and 40 scfh. Preferably, the hydrogen gas is generated at a rate of 100 standard cubic centimeters per minute and 1200 standard cubic centimeters per minute with a preferred output of 200 standard cubic centimeters per minute.

Both low pressure hydrogen generator 38 and high pressure hydrogen generator 36 utilize their respective phase separators 66 to recover excess water for reuse and return it to the water storage tank 60 via conduits 76. The storage tank 60 is sized to hold enough water to allow the hydrogen generators 36, 38 to fill the hydrogen storage system 56. Typically, a 4 kW system will generally utilize a tank with a capacity of at least 50 gal (190 L). The water recovery conduits described herein help minimize the need to add additional water to the system. Optionally, water deionizing system , preferably capable of processing the water to a purity of 8 mOhms could be connected to the hydrogen generators to provide fresh water on an as-needed basis. Water is withdrawn from the storage tank 60 via conduit 77 by pump 78 that fills the oxygen-water phase separators in the hydrogen generators 36, 38 via conduit 80.

It should be appreciated that while the preferred embodiment shows a single lower pressure hydrogen generator and a single high pressure hydrogen generator, any number or combination of low and high pressure generators may be used in combination depending on the needs of the application. In addition, while the preferred embodiment illustrates the hydrogen gas generated through water electrolysis, other hydrogen gas generation technologies, such as hydrocarbon or natural gas reformation would equally function in the present invention.

Hydrogen gas exits the hydrogen generators 36, 38 via conduit 54 that delivers the gas to hydrogen storage system 56. In response to a loss of electrical power from the external source 22, hydrogen gas is released from the storage module 56 and conducted via conduit 58 to an optional building manifold 82 which allows the hydrogen gas to enter the building, cabinet or container which houses the generation system 26. A second conduit 84 transfers the hydrogen gas to the power generating modules. In the preferred embodiment, there are multiple power generating modules 34, each of which is fed by its own conduit 84. However, only one power generating module 34 is shown in FIG. 2 for clarity. The hydrogen gas is received by a fuel cell 86 which electrochemically combines the hydrogen gas with oxygen or air to generate electrical power. In the preferred embodiment, the fuel cell 86 contains an ion conducting polymer and a membrane electrode assembly (not shown) to perform the electrochemical process. An electrical DC/DC converter 88 receives the electrical power from the fuel cell 86 and transmits the power to the load center 28 which transmits the electrical power to the load 30.

A waste by-product of the fuel cell 86 electrochemical process is water that is formed by the combination of the hydrogen and oxygen. A conduit 90 conducts the water to phase separator 92 which separates oxygen gas and air from the water stream and vents the gases via conduit 96. A drain conduit 94 is connected to the phase separator 92 to remove water from the system. In the preferred embodiment, the conduit 94 transfers the water from power generating module 34 to the storage tank 60.

Figure 3:
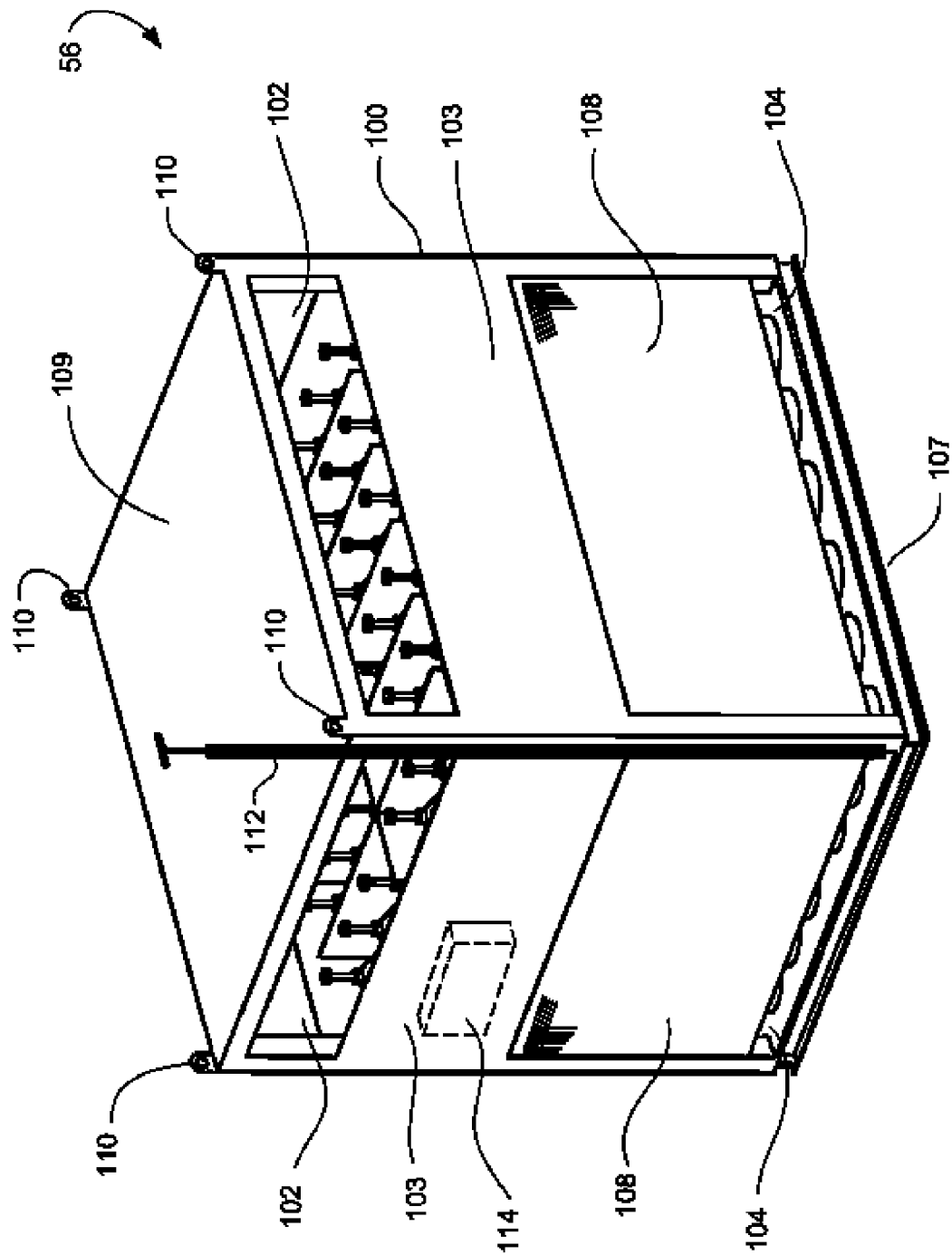
FIG. 3 is a perspective view illustration of the hydrogen storage system of FIG. 1.
Figure 4:
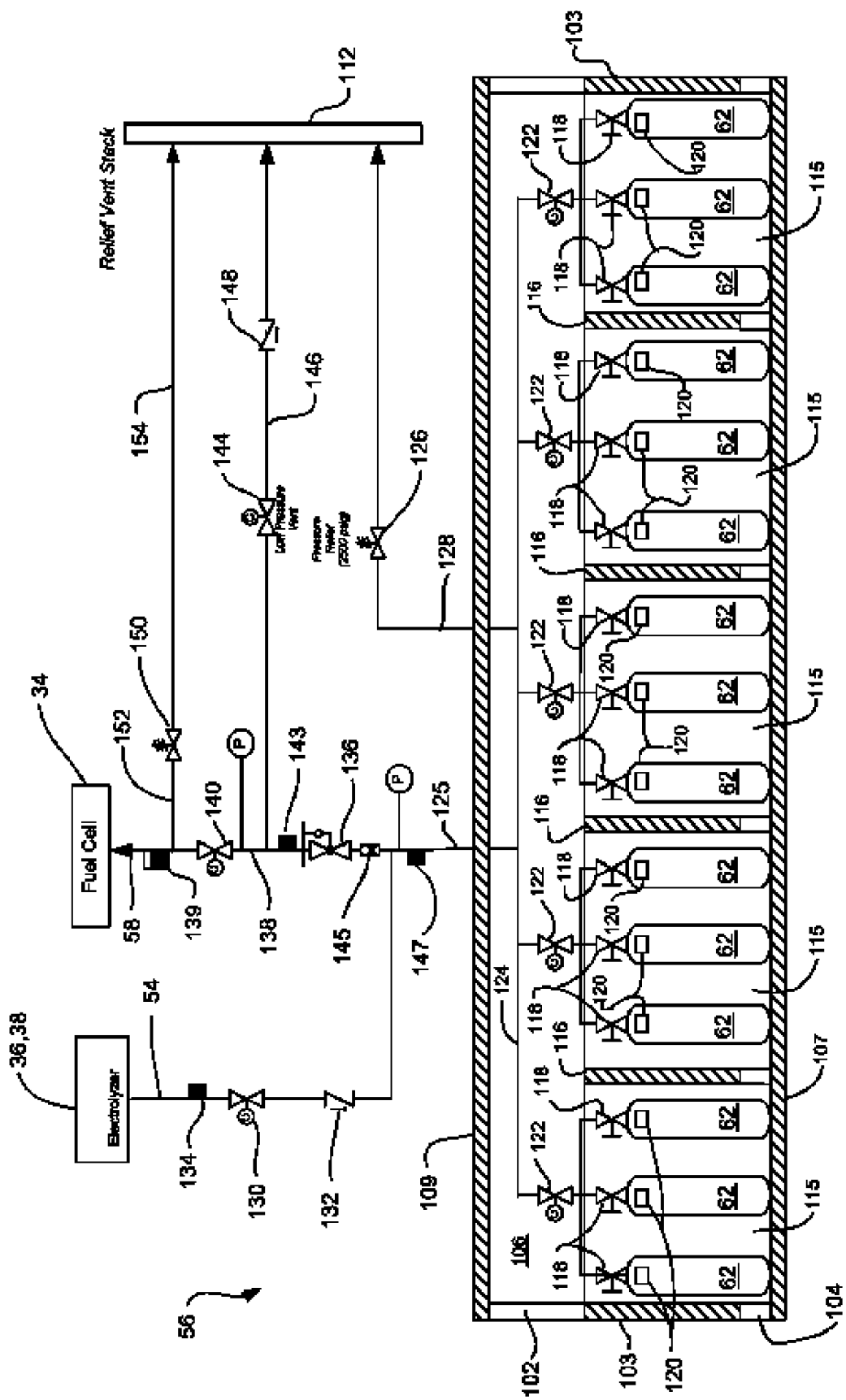
FIG. 4 is a schematic diagram illustrating the mechanical connections of the hydrogen storage system of FIG. 3.

Referring now to FIG. 3 and FIG. 4, the hydrogen storage system 56 will be discussed in more detail. The hydrogen storage system 56 includes a housing 100 having a upper and lower set of openings 102, 104 located in the side walls 103 which allow ventilation of an interior portion 106. Each of the walls 103 further includes a perforated/screen portion 108. A roof 109 closes the top of the housing 100 and includes an optional set of mounting brackets 110 are provided to assist in moving the system 56. A platform 107 encloses the bottom of the housing 100 and a vent 112 is attached to one of the walls 103. A controller 114, typically located internally to the housing 100 provides any necessary control functions for the hydrogen storage system 56 and also communicates with the other components in the regenerative fuel cell system 20. It should be appreciated that the controller 114 may be located in the housing 100 as shown, or remotely from the housing 100 depending on the needs of the application.

The interior portion 106 of the housing 100 is subdivided by partitions 116 into a series of compartments 115 containing hydrogen gas storage containers 62. In the preferred embodiment, each compartment 115 holds three hydrogen containers 62. Each of the hydrogen containers 62 will typically include a dispensing valve 118 and pressure sensitive relief valve 120. The pressure sensitive relief valve may be any type of valve, such as a burst disk, which is intended to vent the container 62 in the event that the pressure of the gas inside the container 62 exceeds a recommended operating level. In the preferred embodiment, the top of the partition 116 is located vertically above the dispensing valve 118 and the relief valve 120 and the top of the container 62. The positioning of the partition 116 with respect to the valves 118, 120 and the container 62 provides advantages in the event that a fire should ignite in one of the individual containers 62 or its valve. Since the top of the partition 116 is above the point where a fire could ignite, the partition 116 acts as a barrier preventing the heating of the surrounding containers 62 and thus preventing the respective pressure relief valves from opening and providing additional fuel for the fire.

A set of valves 122 control flow both to and from the containers 62 in each of the compartments 115. A conduit 124 interconnects each of the valves 122 and through conduit 125 to allow eventual filling or dispensing of hydrogen gas to the generating system 26 via conduits 54 and 58. Conduit 124 also connects to vent stack 112 via conduit 128. A pressure relief valve 126 is connected to conduit 128 to allow venting of the hydrogen storage system 56 if the hydrogen gas pressure in the system 56 exceeds a predetermined threshold, such as the maximum working pressure of the storage containers 62. In the preferred embodiment, the pressure relief valve 126 opens when the hydrogen gas pressure exceeds 2500 psi.

After hydrogen generators 36, 38 create the hydrogen gas, solenoid valve 130 opens to all conduit 54 to transfer the hydrogen gas to conduit 125. A check valve 132 prevents reversal of the flow of hydrogen gas back to the hydrogen generators 36, 38. A pressure transducer 134, located upstream from the solenoid valve 130 detects the pressure of the hydrogen gas being generated by the hydrogen generators 36, 38. Once the containers 62 are filled to the appropriate pressure, solenoid valve 130 closes.

In the event of a power loss from external source 22, conduit 125 transfers hydrogen gas to the power generation modules 34 by transferring the high pressure gas, typically at 2000 psi, through a pressure regulator which lowers the working pressure of the hydrogen gas to a predetermined pressure which the power generation modules can utilize. In the preferred embodiment, the pressure of the hydrogen gas in conduit 138 is between 50 psi and 180 psi with a preferred pressure of 150 psi. An optional filter 145 may be used to prevent contaminants from entering the regulator 136. After the regulator 136, the hydrogen gas stays in conduit 138 until solenoid valve 140 opens, allowing the gas to transfer via conduit 58 the power generation modules 34 as described herein above.

Since the storage system 56 may spend a considerable amount of time in an idle or "stand-by" condition, it will not be uncommon for the pressure in conduit 138 to vary. However, since a loss of pressure in the conduits 58, 138 may indicate a breakage in the conduits 58, 138, a pressure switch 139 indicates whether sufficient pressure is being maintained in the line. As will be described in more detail below, the switch 139 is connected to a safety chain that will close the solenoid valve 140 and disable the regenerative fuel cell system in the event that an abnormal event such as a conduit breakage occurs. In the preferred embodiment, the pressure switch is closed if the pressure in the conduit 58 is maintained at a pressure greater than a predetermined value. In the preferred embodiment, the switch pressure is 10 psi. If the pressure drops below the predetermined value, the switch 139 opens activating the aforementioned safety chain.

Since the storage system 56 needs to maintain a constant pressure in the conduits 58,138 an issue arises in the stand-by mode since normal leakage through valves and fittings may cause the pressure in conduits 58, 138 to rise above or fall below the desired operating range (e.g. 50 to 180 psi). To maintain the appropriate pressure in the conduits 58, 138 controller 114 uses a closed loop control arrangement to operate vent solenoid valve 144 and tank valve 122. Storage system 56 monitors the frequency that the pressure in conduits 58, 138 needs to be adjusted. Since frequent adjustments may indicate an issue requiring maintenance or repair, if the frequency rise above a predetermined threshold, the storage system 56 will issue a critical event message and disable the system 20.

Conduit 142 connects conduit 138 to a pressure vent solenoid valve 144. Due to the large differential pressure across regulator 136, gas leakage through the regulator 136 may over time allow pressure to increase in the conduit 138. If pressure sensor 143 detects a pressure greater than the desired power module 34 operating pressure (e.g. 180 psi), controller 114 opens solenoid valve 144 allowing a portion of the hydrogen gas to vent through conduit 146 to the vent stack 112. Once the desired operating pressure is obtained in conduit 138, the valve 144 closes. A check valve 148 prevents any flow reversal of gas from the external environment into the conduit 146.

Since it is possible for the valves 144 and relief valve 150 to slowly leak gas, over time the pressure in the conduits 58, 138 may drop below the desired operating range (e.g. 50 psi). The controller 114 opens one of the tank valves 118, 122 allowing the higher pressure hydrogen gas from conduit 125 to enter conduits 58, 138 until the desired pressure level is attained. In the event that the regulator 136 should fail allowing high pressure hydrogen gas into conduit 138, a conduit 152 connects to conduit 58 to a pressure relief valve 150 which will open once the pressure in conduit 58 exceeds a predetermined threshold, in the preferred embodiment, the valve 150 opens once the pressure reaches 200 psi. Once the valve 150 opens, the gas transfers via conduit 154 to vent stack 112. In the preferred embodiment, the storage system 56 closes the solenoid valve 122 to prevent unnecessary loss of stored hydrogen gas.

Figure 5:
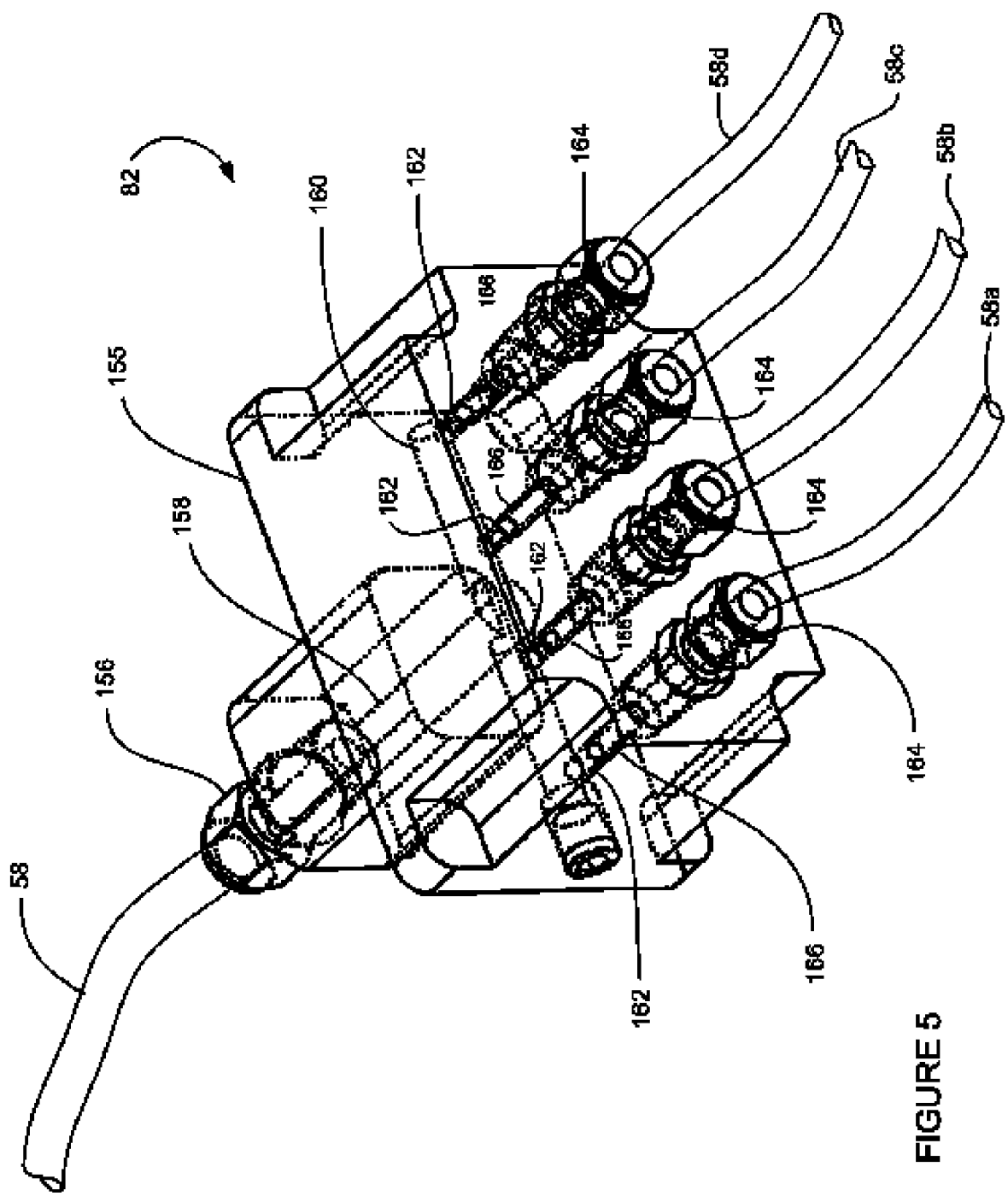
FIG. 5 is a perspective view illustration of the hydrogen building manifold of FIG. 1.

Prior to entering the building or housing 23 which contains the generating system 26, conduit 58 passes through a hydrogen manifold 82 as shown in FIG. 5. This manifold 82 is typically mounted in the wall of the building provides an additional level of protection to limit the flow of hydrogen in the event that a conduit containing hydrogen gas within the building 23 is ruptured. The conduit 58 connected to the manifold 82 through a coupling 156. The hydrogen gas passes into the body of the manifold 155 through the coupling 156 and into passage 158. Passage 158 intersects with a passage 160 that extends transversely through the body 155. A plurality of outlets 162 connect to passage 160 dividing the flow of hydrogen from a single conduit 58 into plurality of conduits 58a, 58b, 58c, 58d via couplings 164. For reasons which will be made clearer herein, the number of outlets which connect to passage 160 is equal to the number of power generating modules 34 in the generating system 26.

Located within each of the outlets 162, is positioned an orifice 166 which restricts the flow of gas through the outlet 162. By appropriately sizing the orifice to limit the flow of gas to that required by the generating module 34, the amount of hydrogen that may leak into the housing 23 in the event that one of the conduits 58a-58d is ruptured. Since the ventilation system within the housing 23 should be appropriately sized, by limiting the flow of gas into the building 23, the levels of combustible gas within the housing should be maintained at levels below the lower combustion level for hydrogen gas. In the preferred embodiment, the orifice 166 is 0.187 inches in diameter which limits the flow of gas to 99 standard liters per minute at 150 psi. It should be appreciated that the number of outlets illustrated in FIG. 5 is not limiting and any number of outlets may be used, it is preferred that there is one outlet 162 per generating module 34. However, multiple power generating modules 34 may be fed gas from a single outlet 162. Conversely, if additional levels of flow protection are desired, multiple outlets may be used to feed gas to a single power generating module 34.

Figure 6:
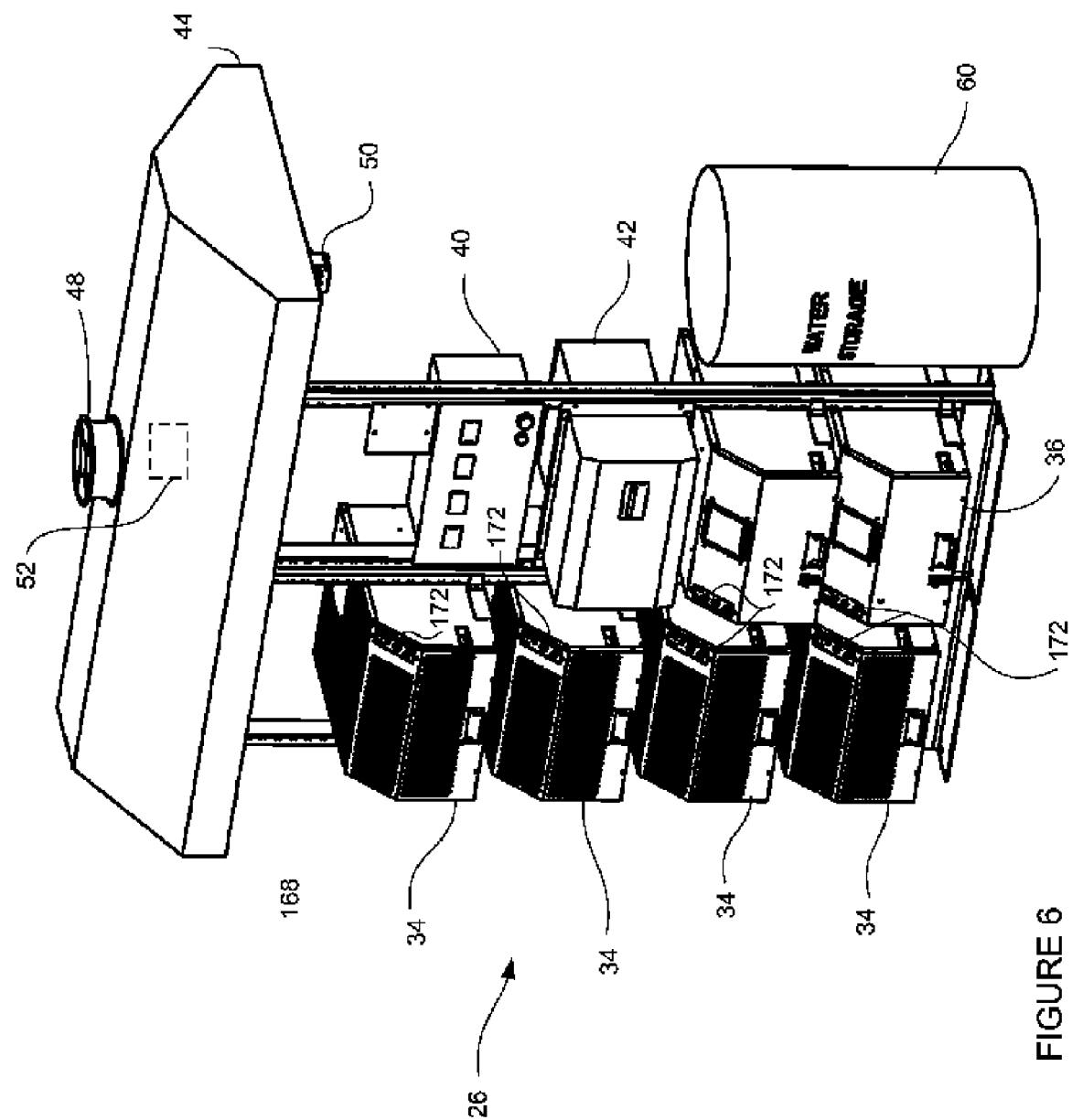
FIG. 6 is a perspective view illustration of the regenerative fuel cell system of FIG. 1.
Figure 7:
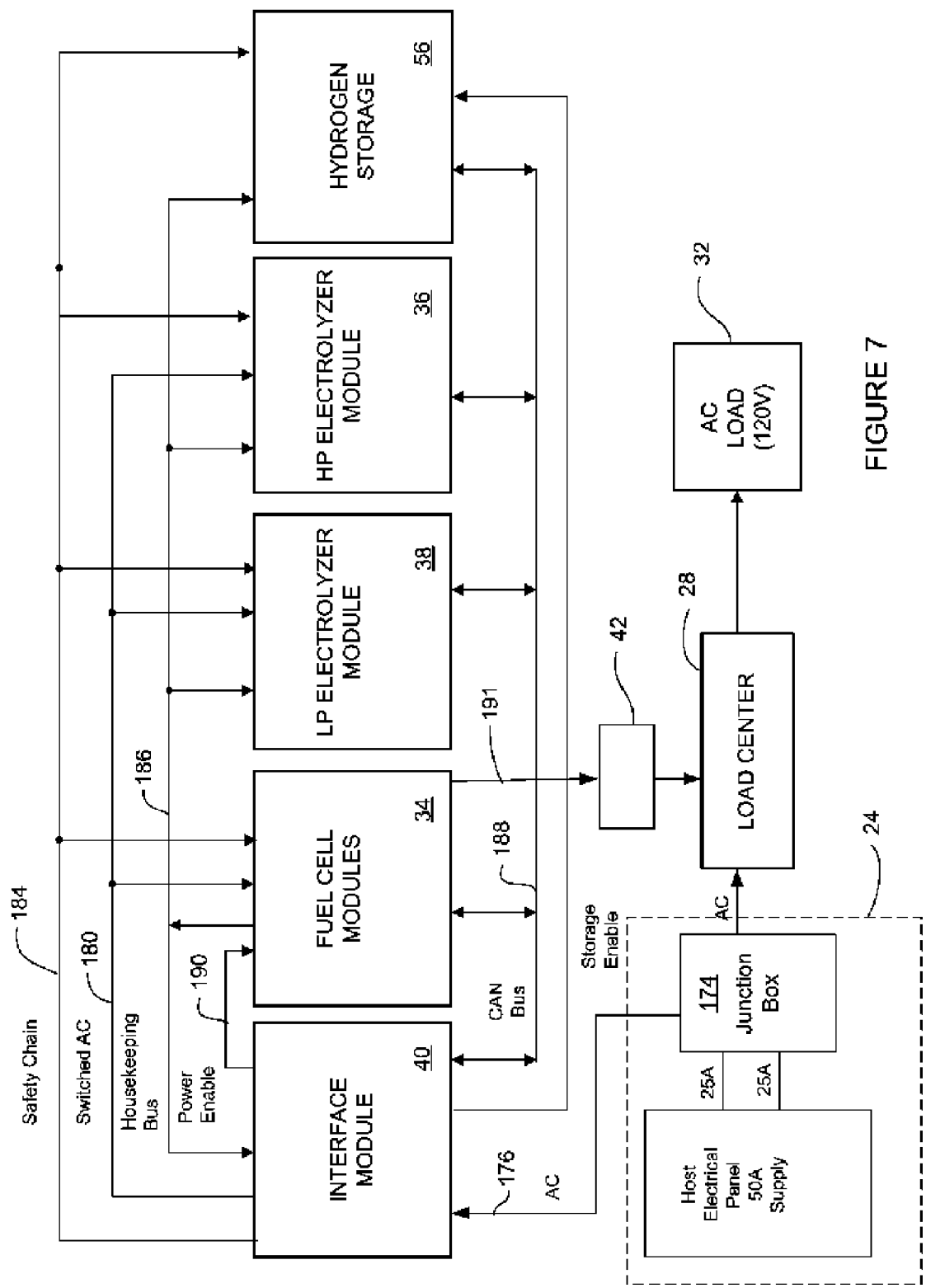
FIG. 7 is a schematic block diagram illustrating the data communications and electrical power interconnections of the regenerative fuel cell system of FIG. 1.
Figure 8:
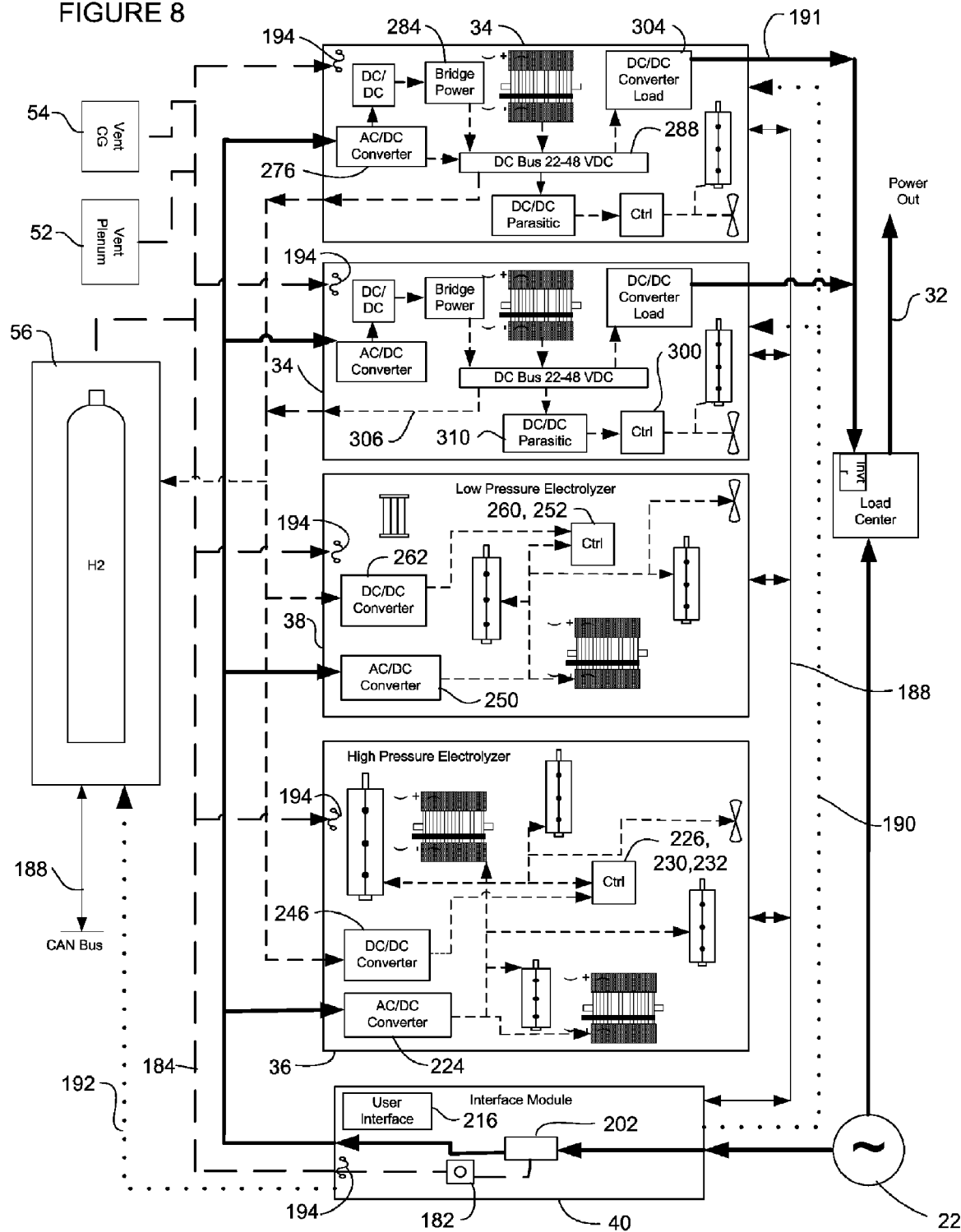
FIG. 8 is a schematic diagram illustrating the electrical interconnections of the regenerative fuel cell system of FIG. 1.
Figure 9:
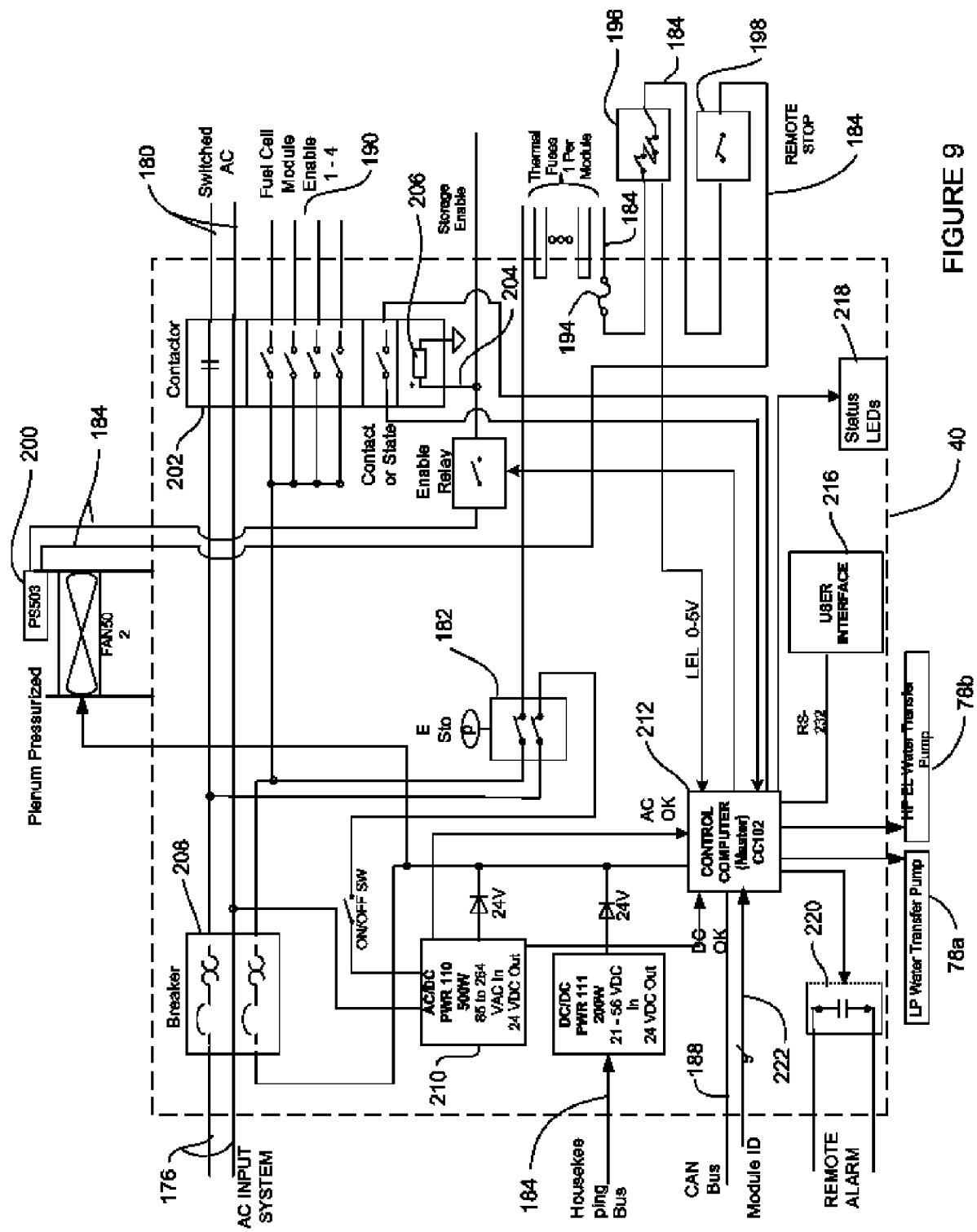
FIG. 9 is a schematic diagram illustrating the interface module of regenerative fuel cell system of FIG. 8.

The generating system 26 is best seen with reference to FIG. 6. In the exemplary embodiment, a plurality of power generating modules 34 are mounted to a rack 168. A high pressure hydrogen generator 36 and a low pressure hydrogen generator 38 are mounted to the rack 168 adjacent the power generating modules 34. A user interface module 40 and an optional inverter 42 are also mounted to the rack 168. It is preferred that the interface module 40 and inverter 42 be mounted vertically above the hydrogen generators 36, 38 to reduce the potential of exposing electrical components to water from the hydrogen generators 36, 38 in the event of a leak.

In the preferred embodiment, a ventilation hood 44 is positioned above the power generating modules 34 and hydrogen generators 36, 38. The ventilation hood contains a fan 48 which draws air from the housing 23 and exhausts it to the external environment through a conduit 46 (FIG. 1). A pressure switch 52 and combustible gas sensor 54 are connected with the aforementioned safety chain. As will be described in more detail below, in the event that ventilation is lost due to a failure of the fan 48, or an unacceptable level of combustible gas is detected, the pressure switch 52 or combustible gas sensor 54 will open resulting in the regenerative fuel cell system 20 being disabled.

In the preferred embodiment, the rack 168 includes a center post 170. Each of the power generators 34 and hydrogen generators 36, 38 have their external connection points 172 adjacent the center post 170. This positioning the connection points 172 in relation to the center post 170 allows the hydrogen gas, electrical and water conduits to be routed through the center portion of the rack 168 which further protects the conduits from inadvertently being damaged.

The electrical and communications connections of the regenerative fuel cell system 20 will be described with reference to FIGS. 7-12. Each of the main system components, such as the power generators 34, hydrogen generators 36, 38 and the storage system 56, are intended to operate autonomously from other system components. This provides advantages in terms of scalability and reliability. As will be described in more detail, in the event that a local failure is detected by a system component, each of the system components has the ability to determine if the error or failure is localized, or is a critical event that effects the operation of the rest of the system 20. Since an abnormal operating condition may result in damage to the system 20, a plurality of communications methods are used to monitor the system and provide for redundant communication between the user interface module 40 and the rest of the system components.

AC electrical power enters the system 20 from an external source 22. The electrical panel 24, which contains a junction box 174 that splits the electrical power between the regenerative fuel cell system and the load 32. Under normal operating conditions, AC electrical power leaves the electrical panel 24 and is transferred to a load center 28 which distributes the electricity to the load 32. The electrical panel 24 also provides electrical power to the user interface module 40 via line 176 for use by the regenerative fuel cell system 20. The interface module 40 distributes the AC electrical power through a contactor 178 to the power generators 34 and hydrogen generators via line 180. The AC electrical power also passes through a contactor 202. As will be described in the safety chain description below, emergency stop button 182 breaks the safety chain circuit causing contactor 202 to open and disconnecting AC electric power from the system 20. This allows the operator to disable the entire system by activating a single switch. As will be described in more detail with respect to each of the individual system components, the AC electrical power is used by the system 20 to prepare for an eventual loss of power from the external source 22. During such an event, the power generating modules 34, provide DC electric power via line 191 to inverter 42 which provides AC electrical power to the load center 28 to power the load 32. In addition to the AC electrical power, the system components are also connected to the interface module 40 by the safety chain 184, a housekeeping DC electrical bus 186, a communications bus 188, a power enable 190, and a storage enable 192.

The safety chain 184 provides an interconnection between each of the sensors used in the system 20 to monitor for critical events within the system 20 that require immediate disabling of the system 20 to prevent damage to the equipment. The safety chain 184 is connected to the emergency stop 182 and electrically connects to sensors such as thermal fuses 194, combustible gas detectors 196, pressure switches 200. Optional sensors such as tachometers, thermometers, smoke detectors, pyrometers, water level sensors and the like may also be used depending on the application or environment in which the system 20 will be operating. Safety chain 184 also connects with an enable relay 200 and contactor 202. Contactor 202 is connected to the safety chain 184 by line 204 which connects to the magnet 206 that holds the contactor 202 in the closed position. In the event that an abnormal operating condition is detected by one of the devices in the safety chain 184, the device detecting the anomaly opens a switch which breaks the safety chain circuit. Once the circuit is broken, the magnet 206 de-energizes and allows the contactor 202 to open. This sequence of events results in the disconnecting of the AC electrical power circuit 180, power enable circuit 190 and the storage enable circuit 192.

In addition to the safety chain 184 disconnect points, the user interface module 40 includes a circuit breaker 208, an AC-DC power converter 210 which converts the AC electrical power to an appropriate DC power, such as 24V, which is usable by the controller 212. The housekeeping bus 184 provides unregulated DC electrical power to a DC-DC converter which also provides power the controller 212. The controller 212 receives and transmits messages over a communications bus 188 to determine the overall health of the system 20. In the preferred embodiment, the communications bus operates on a standard protocol, such as the CAN bus protocol defined in international ISO standard 11898 which allows for serial communications between electronic controllers of the system 20. The communications bus 188 is used by the power generators 34, hydrogen generators 36, 38 and hydrogen storage module 56 to notify their present state (e.g. on or off), the occurrence of a local error event, the occurrence of a critical event, or in the case of the hydrogen generators 36, 38 a low water state. If the controller 212 receives a low water signal from the one of the hydrogen generators 36, 38, the controller 212 activates either the low pressure hydrogen generator pump 78a or the high pressure generator pump 78b to provide additional water to the phase separator 68 in the hydrogen generator 36, 38 which sent the low water communication. The pumping continues until a default timeout period is reached or until the hydrogen generators 36, 38 no longer requests water.

In the event that the controller 212 receives a message indicating a critical event in one of the system components, the controller 212 may disable the system 20 via line 214 which de-energizes the enable relay 200. The de-energizing of the relay 200 breaks the safety chain circuit 184 as described above and also removes the storage enable signal over line 192 resulting the closing of valves 130, 140 in the hydrogen storage system 56. Once the system is disabled, each of the system components (power generator, hydrogen generators and storage module) immediately ceases operation. After the operator clears the fault or error, the operator notifies the controller 212 via user interface 216. The controller 212 retains the "all clear" communication until it a start command from the operator via user interface 216. Once the start command is issued, the controller 212 closes the enable relay 200 allowing the contactor 202 to close providing power to the system components. Subsequent or simultaneously with the closing of the enable relay 200, the controller 212 broadcasts the "all clear" signal over the communication bus, allowing the system components to resume operation. In the event that the system components do not receive the "all clear" signal, or if the critical event message is still being received, they will not operate (e.g. generate hydrogen, provide hydrogen gas, generate electrical power).

Controller 212 also connects with status LED's 218 to provide the operator with a visual feedback on the status of the system. Additionally, an ID signal 222, typically a discrete jumper, is provided to the controller 212 to use in conjunction with the communications protocol to indicate to the controller 212 when a communication is intended for the interface module. Optionally, a remote alarm 220 may be connected to the controller 212 to provide feedback to a remote control room (not shown).

Events within any of the modules that prevent operation of the system, but do not constitute a safety critical event will result in the issuance of a malfunction event. The malfunction event allows the system to remain powered to facilitate monitoring and correction of the faulty condition without the need to activate the safety chain shut down circuit.

Figure 10:
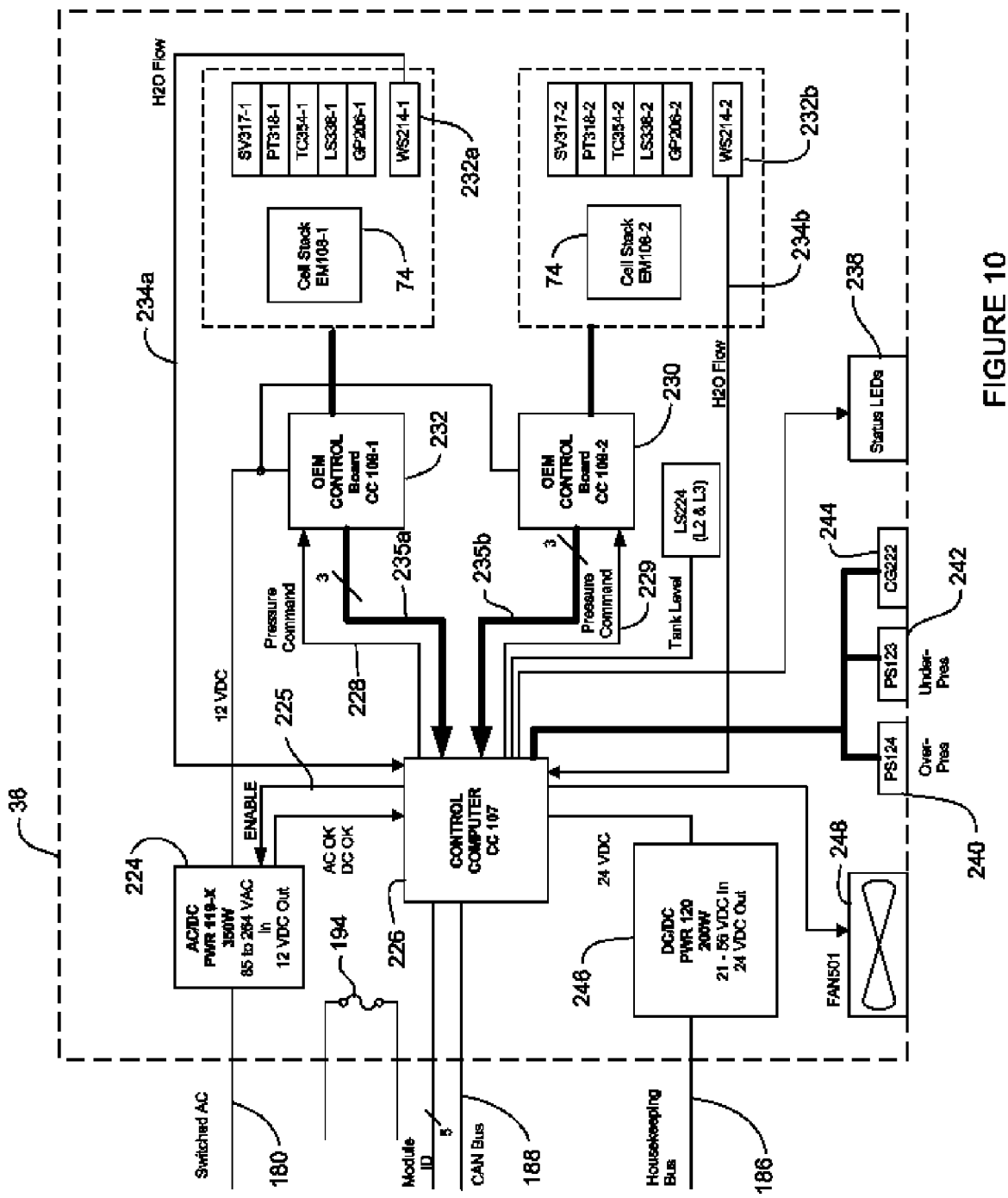
FIG. 10 is a schematic diagram illustrating the high pressure electrolysis module of the regenerative fuel cell system of FIG. 8.

The electrical connections of the high pressure hydrogen generator are best seen in FIG. 10. As describes above, AC electrical power is received from line 180 and converted by AC/DC power converter 224 which transforms the electrical power into a level of DC electrical power that is usable by the internal generator components. If the HP controller 226 has AC power available, and it receives "high pressure hydrogen needed" communication from the storage module controller 114, an enable signal is provided to the power converter 224 via line 225 and a pressure command is issued via line 228, 229 to subcontrollers 230, 232 which provide power to the electrochemical cell stacks 74 to generate hydrogen gas.

While gas is being generated, the HP controller 226 monitors the water flow to the electrochemical stacks 74 through pressure switch 232a, 232b via line 234a, 234b. A water level sensor provides a signal to the HP controller 226 as to the level of water in the phase separator 68. If the water level drops below a predetermined threshold, the HP controller 226 issues a "water low" signal via the communication bus 188 to the interface module to provide additional water from the water storage tank 60. Each of the subcontrollers 230, 232 also provide the HP controller 226 a status signal 235a, 235b for the pump that is providing water to the electrochemical stacks 74. By monitoring the states of each signal 234, 235 the HP controller is able to detect if there is a problem with the water supply to the electrochemical stack 74. For example, if there is no or a very low pressure reading from one of the switches 234 and a "pump on" signal from either of the subcontrollers 230, 232 via line 235, that would indicate a potential water line breakage. Since a lack of water could potentially damage the electrochemical cell stack 74, it would be advantageous to stop the process as soon as possible. Accordingly, the HP controller 226 removes the pressure command via line 228 causing the subcontrollers 230, 232 to remove power from the electrochemical cells 74 and minimize the risk of damage. In this type of local error event, there is no issue or problem with allowing the system 20 to keep operating since the other components in the system can maintain operation without risk of damage. As such, the HP controller 226 indicates an error to the LED's 238 and sends a state change communication to the interface module 40. Until the operator clears the fault, the hydrogen generator 36 ceases operation. Other examples of error events include an overpressure signal from pressure switch 240 which could indicate a blocked air vent, or an under pressure signal from pressure switch 242 indicating a failure of the fan 248. It should be appreciated that the above description of the hydrogen generator is for exemplary purposes and that the same functionality could be accomplished using a single controller.

A combustible gas detector 244 located in each hydrogen generator 36 monitors for unacceptable levels of combustible gas within the hydrogen generator 36. In the event that the level of combustible gas within the hydrogen generator exceeds a predetermined threshold, such as 25% of the lower flammability limit of the gas, the HP controller 226 broadcasts a "critical event" signal via the communications bus 188. The HP controller 226 may also receive signals from the communications bus 188. In the exemplary embodiment if another system component detected a critical event, the HP controller 226 would receive a "critical event" signal, and would immediately ceases operation. As was described above, the HP controller will not generate hydrogen gas until an "all clear" signal is received from the interface module 40. A second type of communication that the HP controller 226 could receive is a "system event" signal indicating that there is a potential issue in another one of the system components that would prevent normal operation. After receiving this signal, the HP controller 226 would remove the pressure signal 228, 229 and stop the generation of hydrogen gas, but would not turn itself off. A third communication that the hydrogen generator 36 could receive in the exemplary embodiment is a "high pressure hydrogen needed" signal as described above, which would initiate the production of high pressure hydrogen gas.

The electrical power needed by the HP controller 226 and the ancillary equipment, such as the cabinet fan 248 and sensors 240, 242, 244 is provided by the housekeeping bus 186 via DC/DC power converter 246 which provides an appropriate DC electrical power to the HP Controller. In the preferred embodiment, the power converter 246 produces 24 VDC electrical power. Providing power to the HP controller 226 from the housekeeping bus 186 provides a number of advantages over using the AC electrical power provided by the external source 22. As will be described in more detail below, the electrical power for the housekeeping bus is provided by the power generating modules 34. By operating off of electricity provided by the power generating modules, it is highly improbably that a loss of power from external source 22 will effect the controls of the hydrogen generator 36, allowing it to shut down in a controlled and planned manner even in the event of power loss and to allow health monitoring to detect other error events, such as a critical event that would necessitate disabling the system 20.

Figure 11:
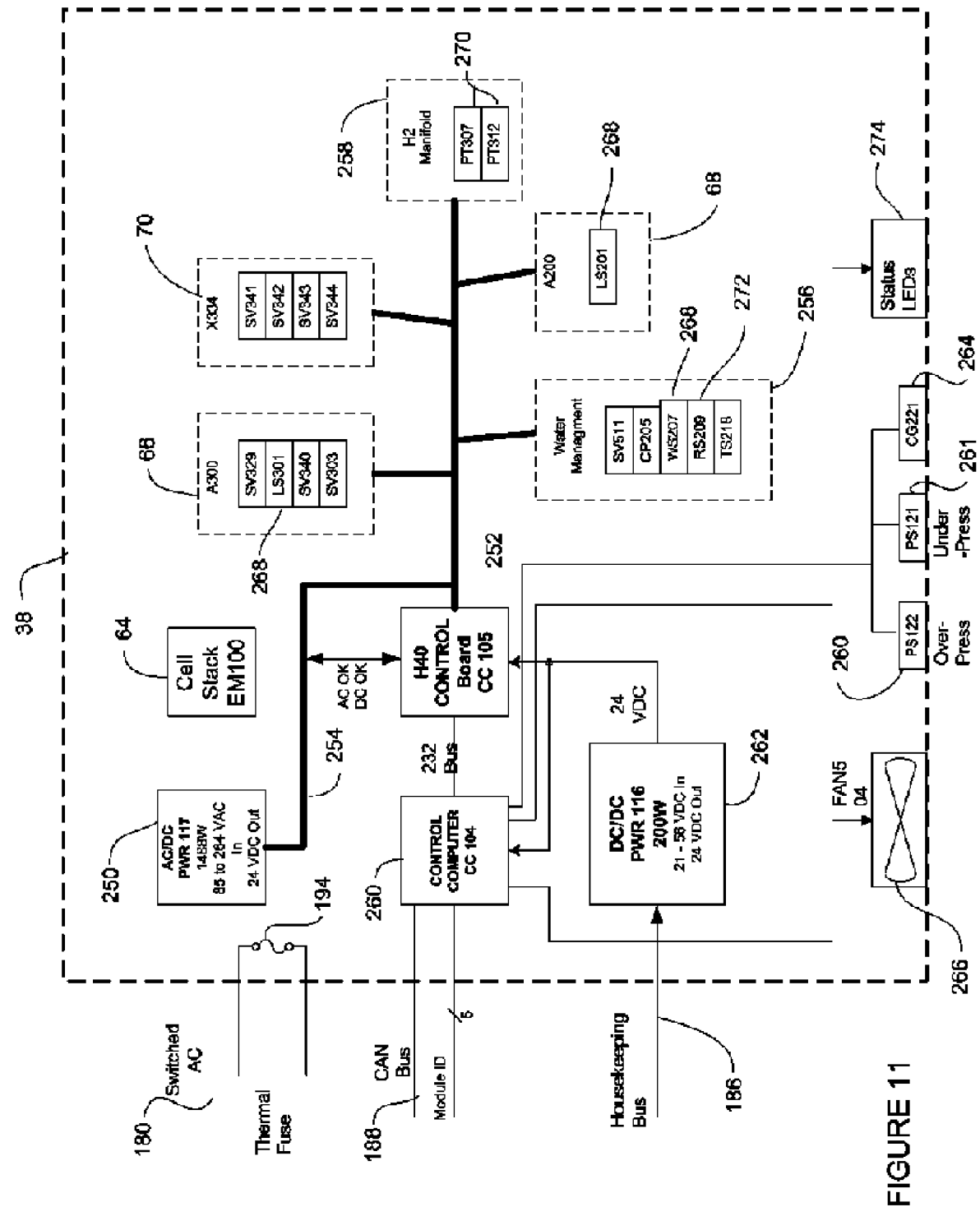
FIG. 11 is a schematic diagram of the low pressure electrolysis module of the regenerative fuel cell system of FIG. 8.

Referring now to FIG. 11, the electrical connections for the low pressure hydrogen generator 38 are shown. In a similar manner to the high pressure hydrogen generator 36, the AC electrical power is received by an AC/DC power converter 250 from line 180. The power converter 250 converts the AC power into a DC electrical power that is usable by the electrochemical cell 64 and the ancillary equipment 66, 70, 68, 256, 258. The power converter 250 and the ancillary equipment connects to the cell controller 252 via line 254. If the LP controller 260 received a "low pressure hydrogen needed" signal via communications bus 188, the LP controller signals to the cell controller to initiate hydrogen production. In response to this signal, the cell controller sends an enable signal via line 254 to power converter 250 which provides electrical power to the electrochemical cell stack 64.

LP controller 260 and the cell controller 252 receives its electrical power from DC/DC converter 262 which receives DC electric power from the housekeeping bus 186. Electrical power for all the ancillary equipment controlled by the LP controller 260, such as the pressure sensors 260, 262, combustible gas sensor 264 and fan 266 are also provided by the housekeeping bus 186 via power converter 262. For similar reasons discussed above with respect to the high pressure hydrogen generator 36 it is advantageous to provide of power from the housekeeping bus 186 so that control of the generator 38 may be maintained even in the event of a power loss from external source 22 and to allow health monitoring to detect other error events, such as a critical event that would necessitate disabling the system 20.

While gas is being generated by the electrochemical cell stack 64, the cell controller 252 monitors the operation of the ancillary equipment. Each of the major components, such as the hydrogen phase separator 66, gas dryer 70, water management system 256, oxygen phase separator 68 and hydrogen gas manifold 258 contain sensors for monitoring water levels 268, gas pressures 270, water quality 272, valve positions and the like. In the event that the cell controller 252 detects an anomaly in the operating conditions, a local error event signal is transmitted to the LP controller 260 and the gas generation process is stopped and the system shut down to minimize the risk of damage to the hydrogen generator 38. Upon receiving the local error event signal from cell controller 252, the LP controller 260 indicates an error to the LED's 274 and sends a state change communication to the interface module 40. Until the operator clears the fault, the hydrogen generator 38 ceases operation. Other examples of error events include an overpressure signal from pressure switch 260 which could indicate a blocked air vent, or an under pressure signal from pressure switch 262. It should be appreciated that the above description of the hydrogen generator is for exemplary purposes and that the same functionality could be accomplished using a single controller.

Similar to the high pressure hydrogen generator 36, a combustible gas detector 264 located in each hydrogen generator 38 monitors for unacceptable levels of combustible gas within the hydrogen generator 38. In the event that the level of combustible gas within the hydrogen generator exceeds a predetermined threshold, such as 25% of the lower flammability limit of the gas, the LP controller 260 broadcasts a "critical event" signal via the communications bus 188. The LP controller 260 may also receive signals from the communications bus 188. In the exemplary embodiment if another system component detected a critical event, the LP controller 260 would receive a "critical event" signal, and would immediately ceases operation. As was described above, the HP controller will not generate hydrogen gas until an "all clear" signal is received from the interface module 40. A second type of communication that the LP controller 260 could receive is a "system event" signal indicating that there is a potential issue in another one of the system components. After receiving this signal, the LP controller 260 would signal the cell controller 252 to stop the generation of hydrogen gas, but not to turn itself off. A third communication that the hydrogen generator 38 could receive in the exemplary embodiment is a "low pressure hydrogen needed" signal as described above, which would initiate the production of hydrogen gas.

Optionally, the system may use a DC energy source such as photovoltaic or wind power instead of the AC grid 22, in this case the input power 180 and associated power components 208, 210, 224, 250, 276 will be based on the DC input instead of an AC input.

Figure 12:
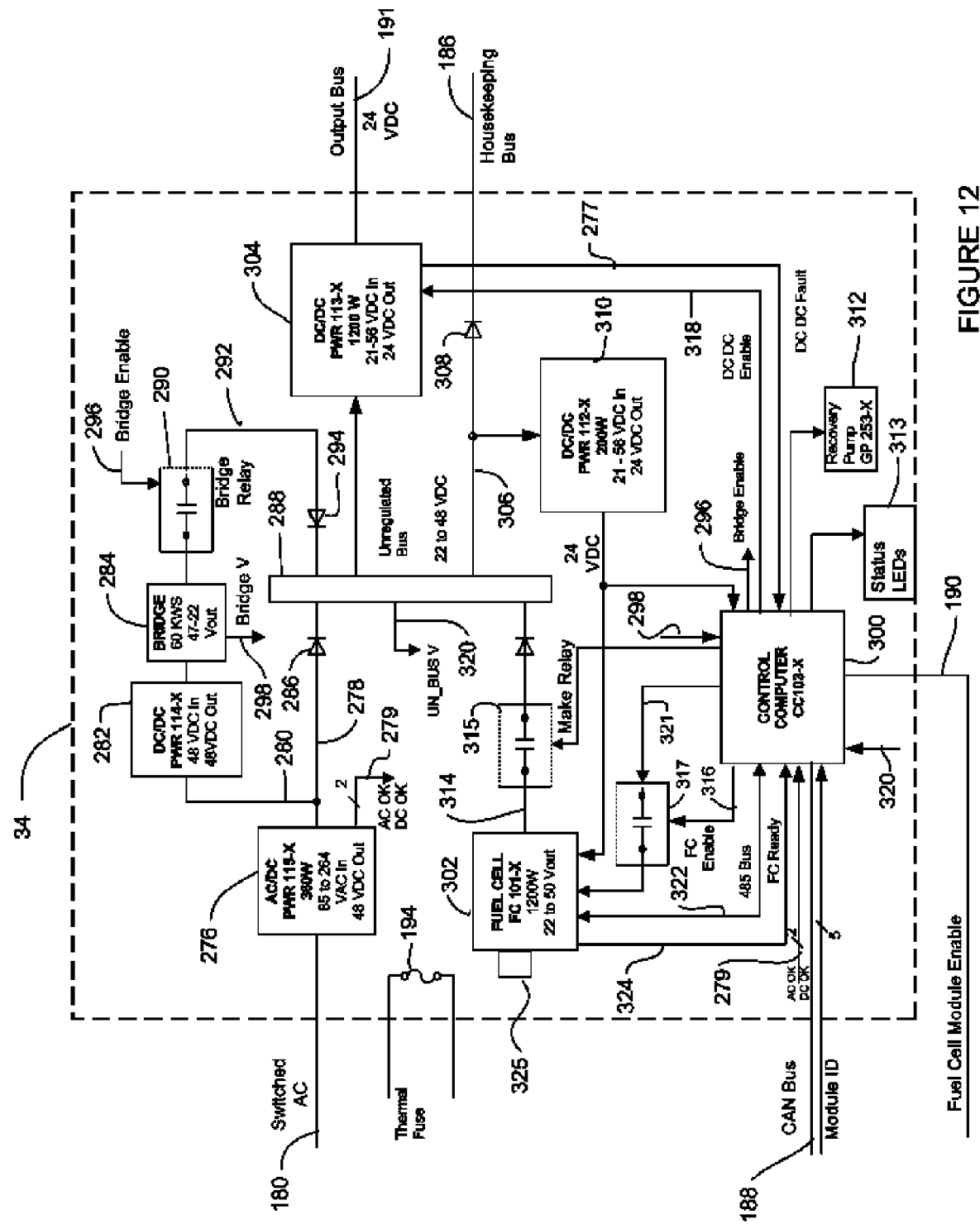
FIG. 12 is a schematic diagram of the fuel cell module of the regenerative fuel cell system of FIG. 8.

Turning now to the power generator 34 which is best shown in FIG. 12. AC electrical power is supplied to the generator 34 via line 180 and received by DC/DC converter 276. The converter 276 transforms the AC electrical power to DC electrical power that is usable by the various components of generator 34. In the preferred embodiment, the converter 276 outputs 48 VDC at 360 W. The output from converter 278 passes along line 278 through diode 286 and into an unregulated bus 288. Generator 34 also includes a bridge energy source 284 which stores electrical energy for use by the system 20 during the initial moments after power loss from external source 22. Converter 278 further provides a signal 279 to FC controller 300 indicating that it is receiving AC electrical power from line 180. The bridge 284 may be any suitable energy storage device, such as a capacitor, a super capacitor, an ultracapacitor, or a battery. The energy stored by the bridge 284 is received from DC/DC converter 282 which receives electrical power from line 278 via line 280. Line 292 connects the bridge 284 connects to the unregulated bus 288 through a relay 290 and diode 294. Relay 290 opens and closes in response to a bridge enable signal 296 received from the FC controller 300. In the preferred embodiment, the relay 290 is closed or "enabled" as provided that the controller 300 determines that no local error events have occurred in the generator 39. As will be made clearer herein, by maintaining the relay 290 in a closed position, the bridge 284 is able to respond to a loss of power from external source 22 nearly instantaneously. Bridge 284 also provides a signal 298 indicating the electrical voltage level remaining in the bridge and available to the system 20.

Unregulated bus 288 connects to the output bus 191 via a DC/DC power converter 304 which transforms the bus 288 voltage which may float over a predetermined electrical power range to an output of 24 VDC which is usable by inverter 42 to power the load 32. Additionally, bus 288 connects to the housekeeping bus 186 via line 306 and diode 208. DC/DC power converter 310 receives electrical power from line 306 and transforms it for use by the FC controller 300 and the fuel cell 302. Fuel cell 302 is connected to the unregulated bus 288 via line 314 and relay 315. The FC controller 300 provides overall control functionality for the generator 39. Ancillary equipment such as water recovery pump 312 and status LED's 313 operate in response to signals from FC controller 300. Similarly to controllers in the other system components, FC controller communicates its current state and the occurrence of a local error event or a critical event message via communications bus 188. In the exemplary embodiment, the converters 304, 276 provide a signal via lines 277, 279 if an error occurs in their operation and fuel cell 302 removes a "ready" signal in the event of an error or malfunction via line 324. These are examples of errors which would trigger a local error event that shuts down the individual power generator 34 without disabling the system 20. In addition to these messages, in the event of a power loss from external source 22, FC controller will broadcast a "request for hydrogen" signal and a "fuel cell pressure" signal to the hydrogen storage system 56.

During normal operation (i.e. external source 22 providing power) when the generator 34 is activated, FC controller 300 receives a signal via power enable line 190 from the interface module 40. FC controller monitors the operation of the generator 34 and providing no errors are detected, FC controller 300 provides a bridge enable signal via line 296 which connects the bridge to the unregulated bus 288. The FC controller also provides an enable signal to relay 317 via line 316 and to converter 304 via line 318. Once these events occur, the power generator 34 is in a condition to provide electrical power to the load 32 if power is lost from external source 32. In the event that power is lost, the converter 276 sends a signal via line 279 to FC controller 300 indicating the loss of AC electrical power. Provided that FC controller is still receiving a power enable signal via line 190, the bridge enable signal will have the relay 290 in a closed position allowing electrical power to immediately flow from the bridge 284 to the unregulated bus 288. In the preferred embodiment, the bridge 284 is able to provide 60 kWS of electrical power at 47 22 VDC. The electrical power from bridge 284 flows through the convert 304 to provide power to the load 32, and also through the housekeeping bus 186FC controller 300 monitors the voltage in unregulated bus 288 via a signal from line 320. If the voltage in the unregulated bus falls below 22 VDC, the FC controller 300 initiates a shutdown procedure.

While the exemplary embodiment uses separate controllers in power generator 34, an alternate embodiment may use a single controller and optionally may eliminate relays 315, 317, 316, 324. Additionally, fuel cell 302 may be run in an idle or a pre-start mode prior to loss of AC power from conduit 180 to eliminate or reduce the need for the bridge circuit 282, 284, 296, 294.

While the bridge 284 is providing power to the load 32, FC controller 300 sends a "request for hydrogen" message via communications bus 188 and a start signal via line 320 to fuel cell 302. If hydrogen is available, the fuel cell 302 starts generating electrical power and transmits it to unregulated bus 288. Fuel cell 302 monitors the pressure level of the hydrogen gas and transmits the pressure level along with any applicable operating parameters via line 322 to FC controller 300. As a check against possible leakage in the conduits feeding hydrogen to the power generator 34, the hydrogen pressure parameter measured by the fuel cell 302 is transmitted via the communication bus 188 to the hydrogen storage system controller 114. The controller 114 compares the pressure value transmitted by the power generation 34 against that measured at the hydrogen storage system 56 to determine if there is a potential leak. In the preferred embodiment, if the hydrogen storage module 56 increases pressure to the power generator 34 for a predetermined period of time and the pressure at the fuel cell does not increase, the hydrogen storage system 56 will transmit a critical event message on communications bus 188 resulting in the disabling of the system 20.

There is also a potential for the hydrogen pressure parameter transmitted to the hydrogen storage system 56 to indicate that the pressure at the fuel cell 302 exceeds a predetermined threshold. To prevent damage to the fuel cell 302, the hydrogen storage system 56 will open the vent valve 144 to relieve pressure in the conduit 58 and the fuel cell 302. Once the pressure at the fuel cell 302 returns to a predetermined operating range, the valve 144 will close.

Figure 13:
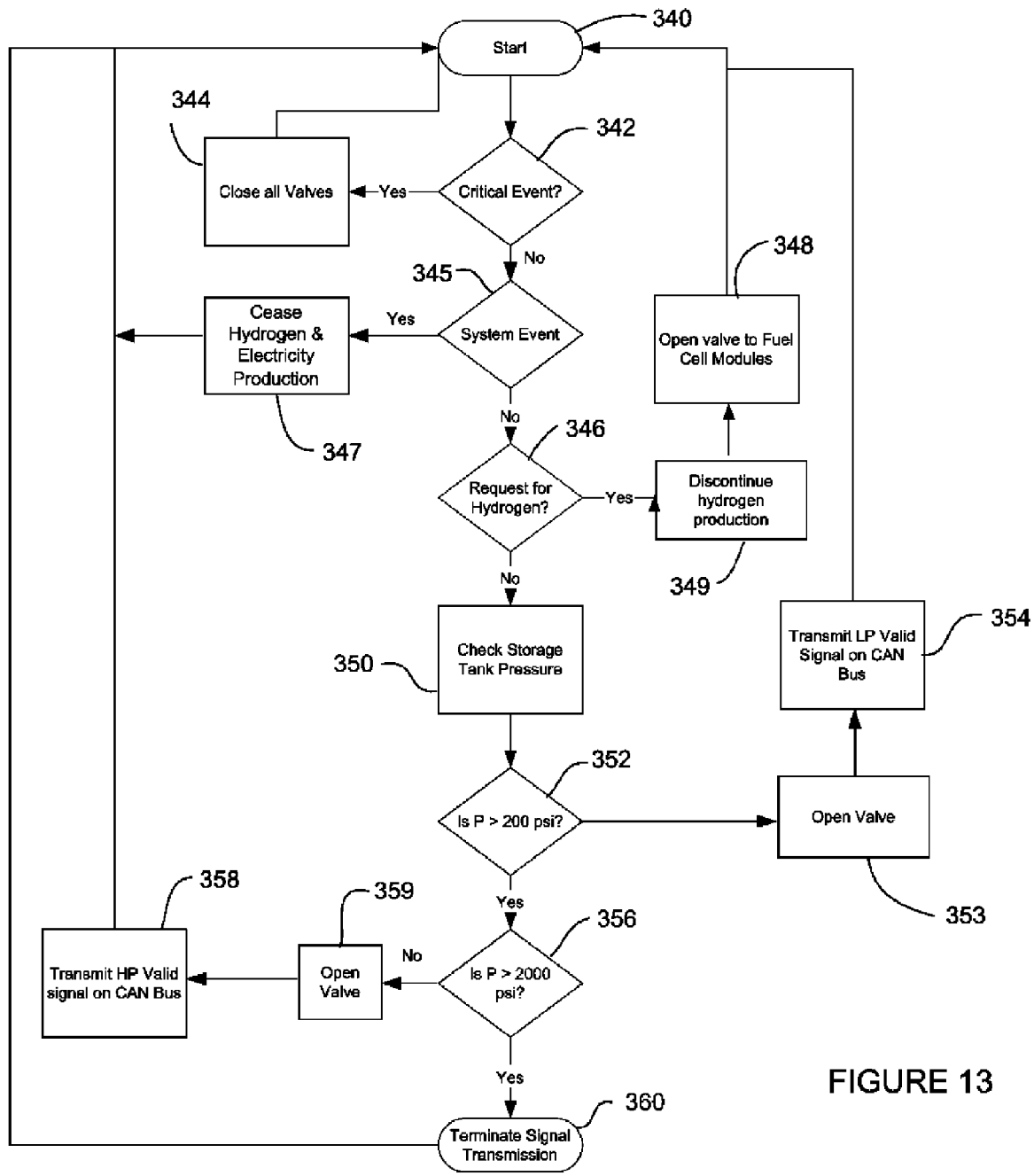
FIG. 13 is a flow diagram of a method of operating the low pressure and high pressure modules and hydrogen storage system.

A method for operating the regenerative fuel cell system 20 is shown in FIG. 13. The system 20 starts at block 340 and first checks to see if a critical event signal is being transmitted on communications bus 188 in decision block 342. If there is a critical event message received, in block 344, the hydrogen storage module closes valves 130, 140 and the hydrogen generators 36, 38, power generators 34, and user interface module 40 shutdown. If there is no critical event message, the system 20 check to see if a system error event signal has been transmitted on communications bus 188 in decision block 345. If there is a message, in block 347 the hydrogen storage module closes valves 130, 140 and the hydrogen generators 36, 38 stop generating hydrogen, and power generators 34 stop producing electricity, but otherwise remain functional.

If there have been no error message, hydrogen storage system 56 monitors for a "request for hydrogen" message in decision block 346. If there is a request signal, this indicates a loss of power from the external source 22. The hydrogen storage system in block 349 discontinues transmitting any "hydrogen needed" signals to the hydrogen generators 36, 38. Valve 140 is opened to provide hydrogen gas to the power generators 34 in block 348 and the system loops back to block 340.

If there is no request for hydrogen signal, the hydrogen storage system 56 proceeds to block 350 where the hydrogen gas pressure in each of the storage tanks 62 is checked to determine if any one of the tanks 62 needs additional hydrogen. In decision block 352, the system determines if the pressure is less than a first desired pressure. In the preferred embodiment, the first desired pressure is 200 psi. If there is a tank at less than the first desired pressure the hydrogen storage system opens the valve 122, and valve 118 associated with the tank 62 requiring filling in block 349 and transmits a "low pressure hydrogen needed" message along communications bus 188 to the low pressure hydrogen generator 38. The system then loops back to block 340 to repeat the process. This process will continue to repeat until all the tanks 62 are filled to a pressure of the first desired pressure.

After all the tanks are filled to at least 200 psi, the process continues to decision block 356 and interrogates each of the tanks 62 to determine if the pressure in any of the tanks is less than the second desired pressure. In the preferred embodiment, the second desired pressure is at least 2000 psi. If there are tanks 62 at a pressure less than the second desired pressure, the hydrogen storage system 56 opens the valves 122, 118 associated with the tank 62 in block 359. The hydrogen storage system then transmits a "high pressure hydrogen needed" message along communications bus 188 to the high pressure hydrogen generator 36. The system then loops back to block 340 to repeat the process. This process will continue to repeat until all the tanks 62 are filled to a pressure of the second desired pressure.

Once all the tanks 62 in the hydrogen storage system 56 have been filled to the proper pressure, the "high pressure hydrogen needed" signal is terminated in terminator block 360, and the system loops to block 340 and is repeated.

As described herein above, in the event of a power failure from the external source 22, the regenerative fuel cell system 20 utilizes hydrogen from the hydrogen storage module 56 to provide fuel for the generating system 26. Referring to FIG. 4, the individual containers 62 in the storage module 56 are manifolded together in groups, in the preferred embodiment, there are three containers 62 connected together. Since the gas stored in the containers 62 is at high pressure, typically being at 200 psi to 10,000 psi, the valve 122 must be able to seal against the pressure differential between the conduit 124 and the stored gas in the containers 62. Typically, the type of valves 122 which are commonly used in this type of application are only able to withstand high pressure differentials in one direction across the valve. When a pressure differential exists in the opposing direction, there is a potential for gas to leak back across the valve 122. Typically, these valves 122 can only withstand a back flow pressure differential of 50 psi to 100 psi.

If during operation, the gas is expended from one group of storage containers, the potential exists for a high pressure differential to exist across the valve 122 between the conduit 124 and a group of storage containers. This is undesirable since it would unnecessarily lead to losses in system efficiency Accordingly, it is considered advantageous to provide a method for cycling through the containers in the storage module 56 in order to maintain a predetermined maximum pressure differential between the storage containers 62.

Figure 14:
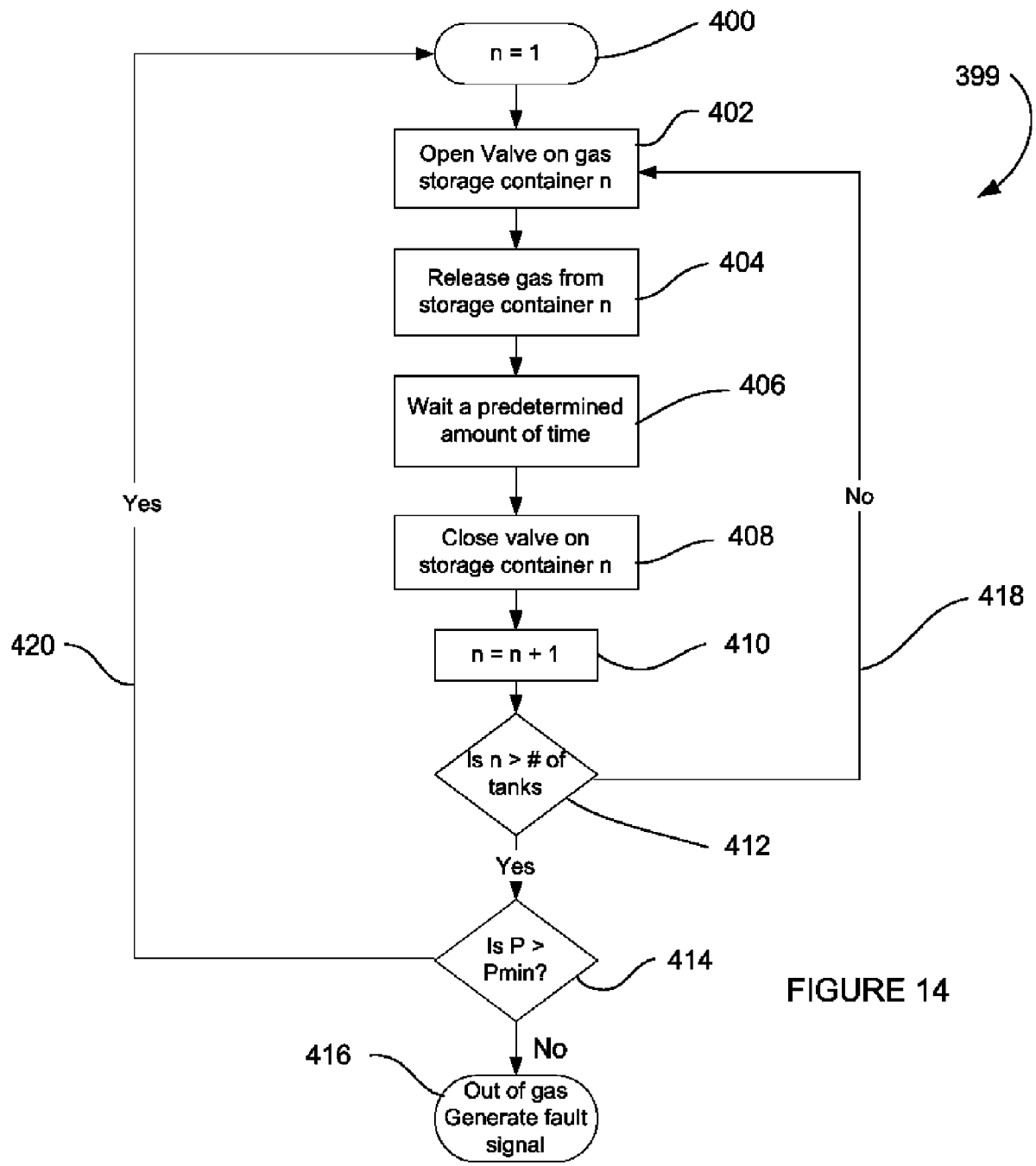
FIG. 14 is a flow diagram of a method of operating a high pressure storage system having multiple storage containers.

Referring now to FIG. 14, a method 399 of operating a high pressure storage module 56 is shown. The hydrogen storage module controller 114 initiates the sequence at block 400. A controller 114 opens 402 the valve 122 for the first group of containers 62 to release 404 the gas into conduit 124. After waiting 406 a predetermined amount of time, the controller 114 closes 408 the valve 122. After incrementing the container group number "n" in block 410, the controller 114 determines in decision block 412 if the last container groups was the last container in the module 56 to be used. If it isn't, the controller 114 loops back on line 418 to block 402 and repeats the process for the next group of containers in the storage module 56.

Once controller 114 utilizes gas from the last group of containers in the module 56, it determines the pressure level in the tanks at pressure transducer 147. If adequate pressure levels remain in the containers 62 to allow operation of the generation system 26, then decision block 414 loops back to the beginning of the process via line 420 to block 400 and repeats the process again. Once the gas pressure in storage containers 62 falls below a predetermined threshold, the process transfers to block 416 where the controller 114 transmits an out of gas signal to the regenerative fuel cell system 20. In the preferred embodiment, the predetermined threshold is the minimum operating pressure of the power generating module 34. Preferably, this pressure is between 10 and 100 psi, and more preferably the pressure is 50 psi.

Figure 15:
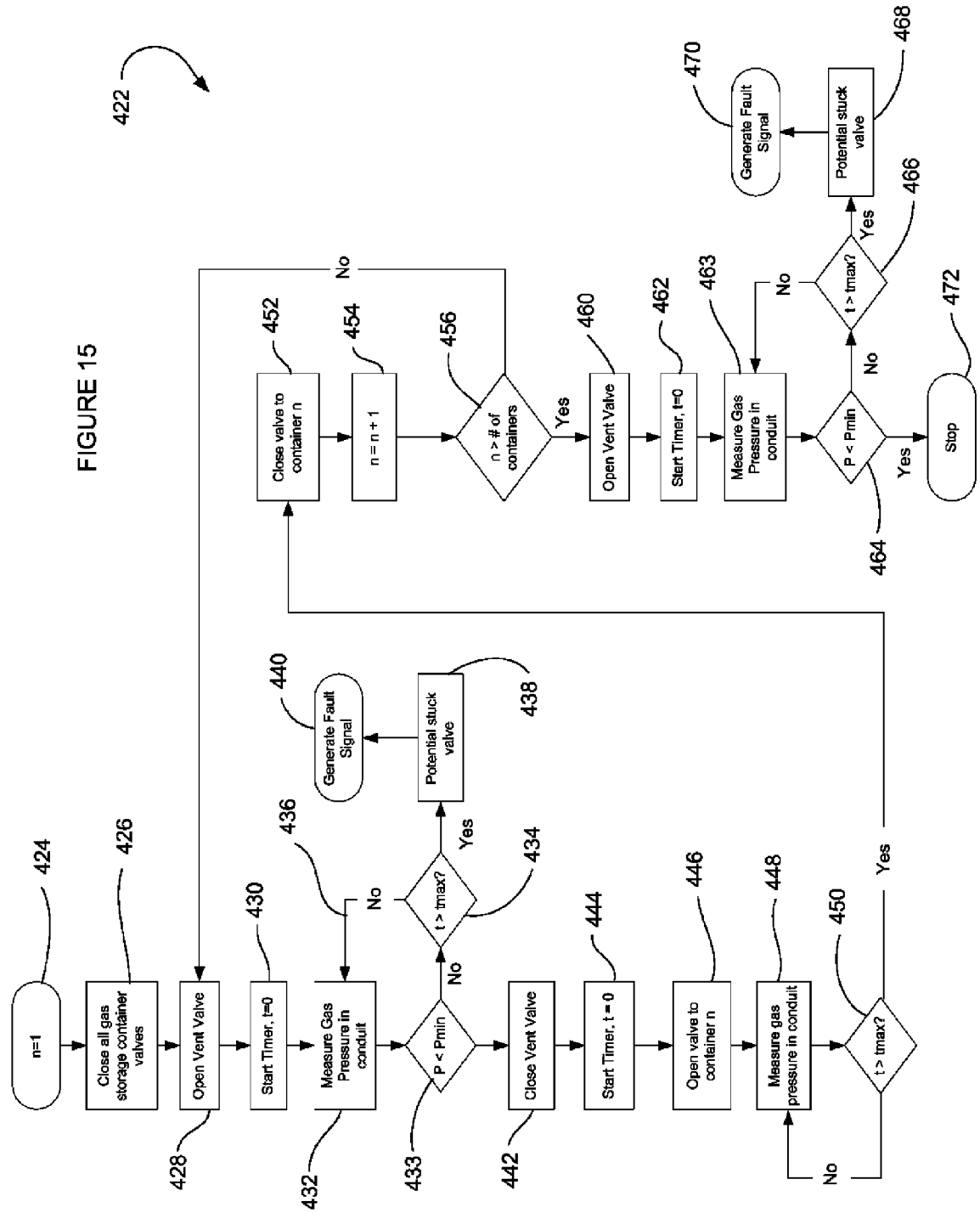
FIG. 15 is a flow diagram of a method of determining the pressure level of the containers in the hydrogen storage system.

In order to be cost effective and to increase reliability, it is desirable to minimize the number of pressure sensors in the hydrogen storage module 56. In the preferred embodiment, a single pressure sensor 147 is used to interrogate the pressure levels for all the storage containers 62 in the storage module 56. As shown in FIG. 15, a process 422 is used to determine the pressure levels in the containers 56. The process 422 starts in block 424 which sets a variable representing the container group number "n" to one. The controller 114 closes 426 all the valves 122 and then opens 428 the vent valve 144 to lower the pressure in conduit 125. The controller starts a timer 430 and measures 432 the gas pressure in conduit 125. If the pressure has not fallen below a predetermined threshold in decision block 433, and the time on the timer 430 is less than a predetermined maximum time, the process loops back via line 436 to measure 432 the pressure in conduit 125.

If the time exceeds a predetermined maximum, decision block 434 continues block 438 which determines there is a potential stuck valve 122 in the storage module 56. The controller 114 will generate 440 a fault signal which is transmitted to the regenerative fuel cell system 20 and exits the process 422. If the pressure does fall below the predetermined threshold, typically 50 psi, the process continues on to block 442 which closes the vent valve 144.

The timer is reset to zero and started once again in block 444. The valve 122 to container group "n" is opened 446 and the pressure sensor 147 measures 448 the gas pressure in the conduit 125. Decision block 450 determines if the time is less than a predetermined threshold, typically 10 30 seconds, and preferably 20 seconds. If it is, the process loops back to continue measuring 446 the pressure in conduit 125. Once the maximum time is reached, the valve 122 for container group "n" is closed 452 and the container group number "n" is incremented by one. Decision block 456 determines if the gas pressure in all the container groups in the storage module 56 has been measured by comparing the group number "n" to the number of groups in the module 56. If there are remaining groups to be measured, the process loops via line 458 to block 428 which opens the vent valve 144 to start the process again.

Once all the container groups have been measured, the process may optionally perform several more steps to determine that a valve 122 is not stuck open. The vent valve 144 is opened 460 and the timer is started 462. The gas pressure in the conduit 125 is measured by pressure sensor 147 and decision block 464 compares the measured pressure to a predetermined minimum pressure, typically 50 psi. If the gas pressure in conduit 125 is greater than the predetermined minimum pressure, decision block 466 determines if the predetermined maximum time has been reached. If not, the process loops back to block 463 to continue to measure the gas in the conduit 125. If the predetermined maximum time has been exceeded, the controller 114 determines 468 that there is a potential for a stuck valve 122 and generates 470 a signal which is transmitted to the regenerative fuel cell system 20 and exits the process 422. If the maximum time has not been exceeded, the process 422 exits 472 normally and continues with further operation.

Figure 16:
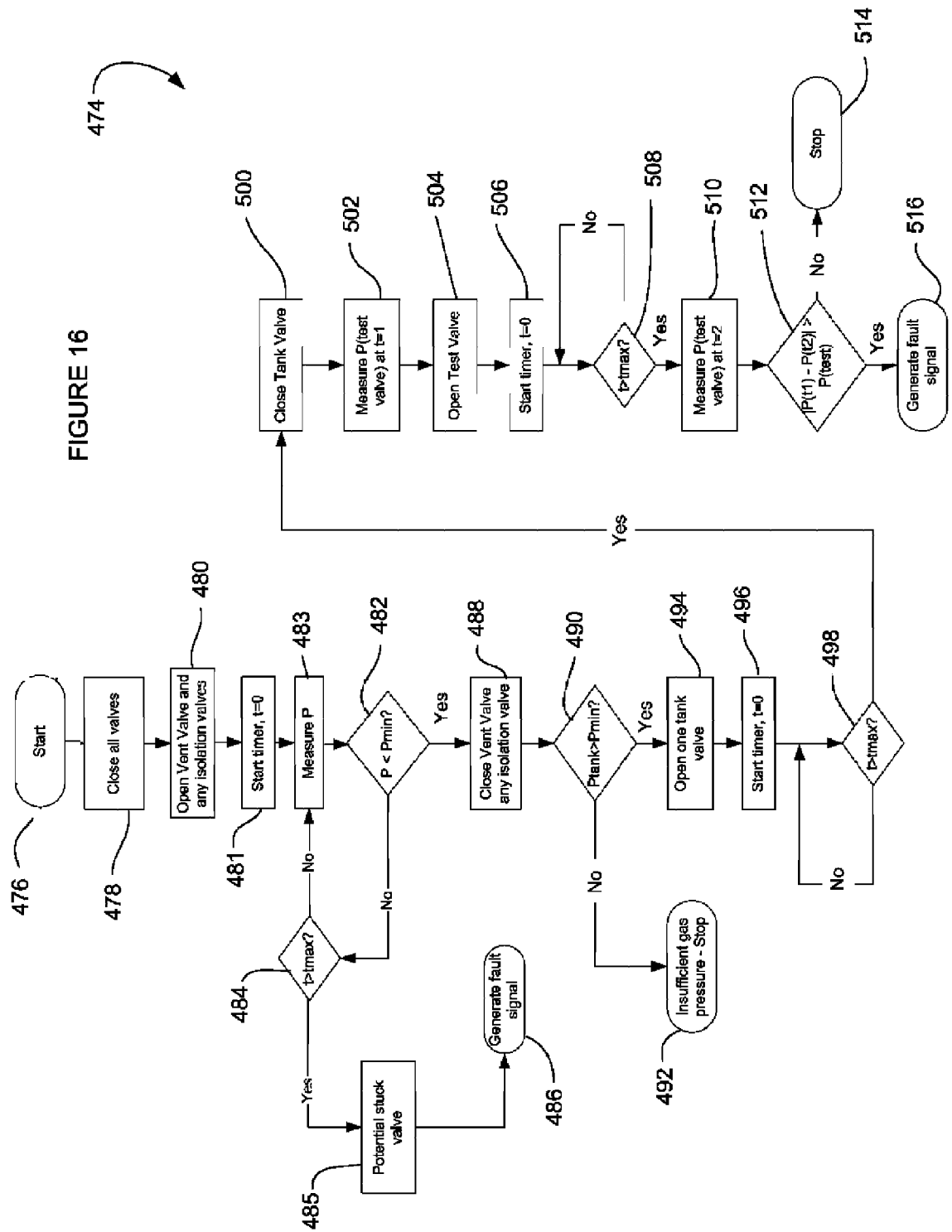
FIG. 16 is a flow diagram of a method of determining the functionality of a valve in the regenerative fuel cell system.

Since the system 20 includes a number of valves, and it is desirable for the system 20 to determine the health of the valves in order to ensure that proper operation is being maintained. FIG. 16 shows the preferred embodiment process 474 that is used by the controller 114 for checking the integrity of valves through the use of system gas pressure. It should be appreciated that the process may be used for any of the valves in the system 20, however, for example purposes, the process 474 will be described for the testing of check valve 132.

The process starts at block 476 and closes 478 all the valves 122, 140, 130. The vent valve 144 and any isolation valves, such as valve 130 are opened 480, and a timer 481 is started. The pressure at sensor 134 is measured 483 and decision block 482 determines if the gas pressure in conduit 54 is less than a predetermined pressure, typically 50 psi. If the pressure has not fallen below the predetermined pressure, decision block 484 determines if the predetermined maximum time has been reached, if it has not, the process loops back to block 483 to continue measuring the gas pressure in conduit 54. If the predetermined maximum time has been reached, the controller 114 determines 485 that there is a potential stuck valve 122 and a fault signal is generated 486 and transmitted to the system 20.

If the pressure in conduit 54 drops below the predetermined minimum pressure, the process proceeds from decision block 490 and closes 488 the vent valve 144 and any isolation valve such as valve 130. In decision block 490, the controller 114 determines if the gas pressure in any one of the container groups is greater than a predetermined minimum gas pressure, typically 50 psi. If the gas pressure in the storage containers is not sufficient, the process exits via block 492.

If there is sufficient gas pressure in at least one storage container 62, then the process opens 494 one of the valves 494. A timer 496 is started and the process enters a time loop via decision block 498. Once a predetermined amount of time has occurred, the process closes 500 the tank valve 122 and a first pressure is measured at pressure sensor 134. The isolation valve 130 is opened 504 and again, the process enters a time loop via blocks 506, 508. Once a predetermined amount of time has occurred, the second pressure in conduit 54 is measured by pressure sensor 134. In decision block 512, if the absolute difference between the first and second gas pressure in conduit 54 is greater than a predetermined value, preferably 20 psi, then the process detects a potential faulty check valve 132 and a fault signal is generated 516 and transmitted to the system 20. If the difference in the first and second pressures in decision block 512 are less than the predetermined threshold then the valve being tested passes and the process exits normally via block 514.

Figure 17:
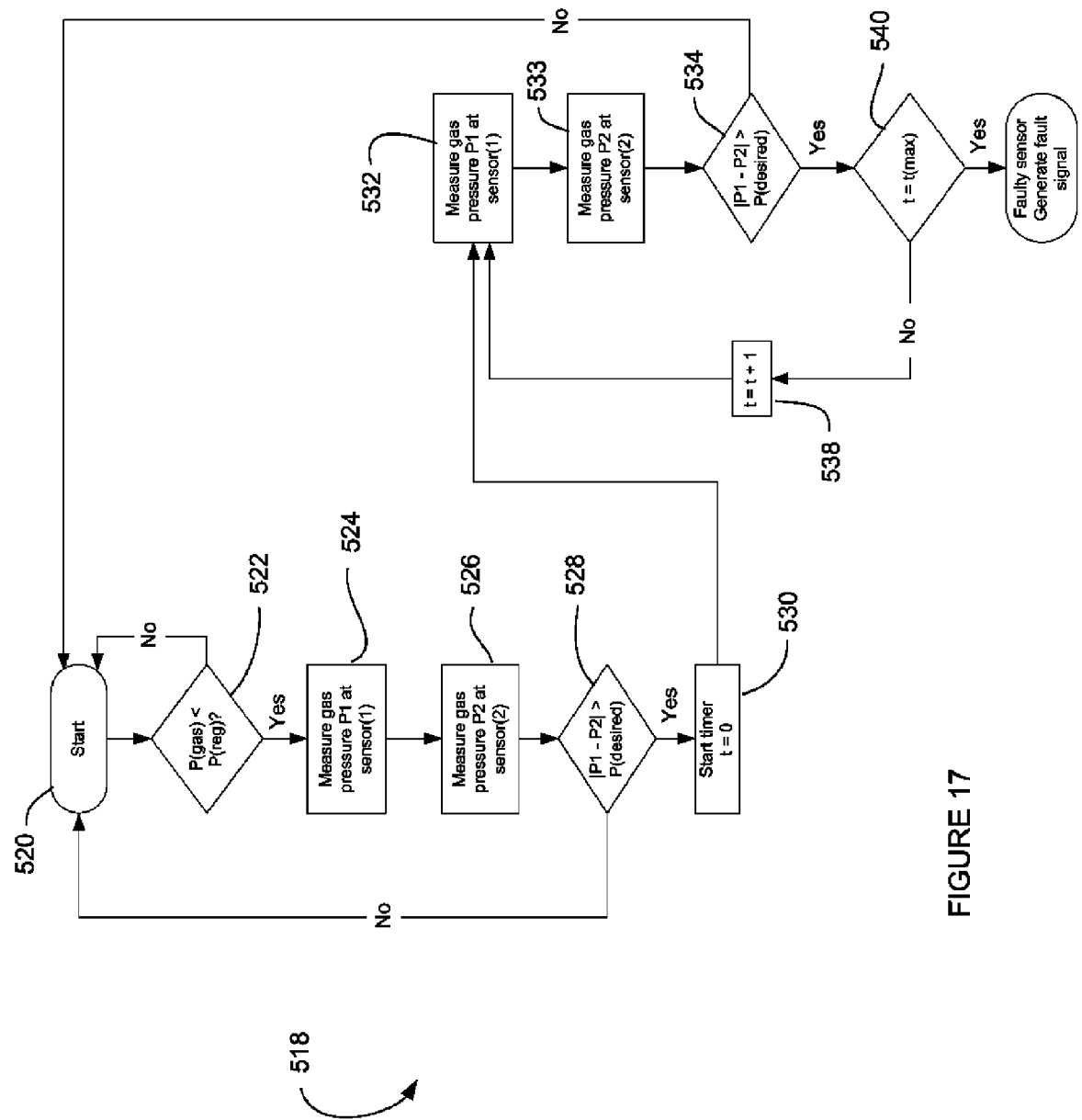
FIG. 17 is a flow diagram of a method for determining the functionality of a pressure transducer in the regenerative fuel cell system.

Since it is desirable to minimize the number of pressure transducers in the system 20, it is advantageous to utilize a process for checking the health or functionality of the sensors to determine that the system can rely on the pressure readings. FIG. 17 shows a process for determining the health of a pressure sensor during operation at low gas pressures. The process 518 starts at block 520 and first checks in decision block 522 to determine if the gas pressure at pressure sensor 147 is at or below the regulation pressure of pressure regulator 136. If the gas pressure is not, then the process loops back to start block 520. If the gas pressure is below the threshold for regulation for valve 136, the process measures 524 the pressure upstream from valve 136 at sensor 147 and measures 526 a second pressure downstream from valve 136 at sensor 143. Since the pressure on either side of the valve 136 should be approximately the same (being below the regulation pressure), the process 518 determines in decision block 528 if the absolute value of pressure difference measured at sensor 147 and sensor 143 is less than a predetermined desired pressure, then the sensors 143, 147 are functioning properly and the process 518 loops back to start block 520.

If the pressure differential does exceed the predetermined threshold, the process 518 continues on to block 530 which starts a timer. The gas pressures are then measured at sensor 147 in block 532 and sensor 143 in block 533. If the absolute value of the pressure differential exceeds the predetermined threshold. The process proceeds to decision block 536 to determine if the predetermined maximum time, typically 5-20 seconds, has been exceeded. If the timer has not been exceeded, the time is incremented 538 and the process continues to measure and monitor the pressure differential. If the pressure differential in decision block 534 falls below the predetermined pressure threshold, then the process loops back to the start block 520. If the timer reaches the predetermined maximum time, the process generates a signal to the system 20 which indicates a potential faulty pressure sensor.

Figure 18:
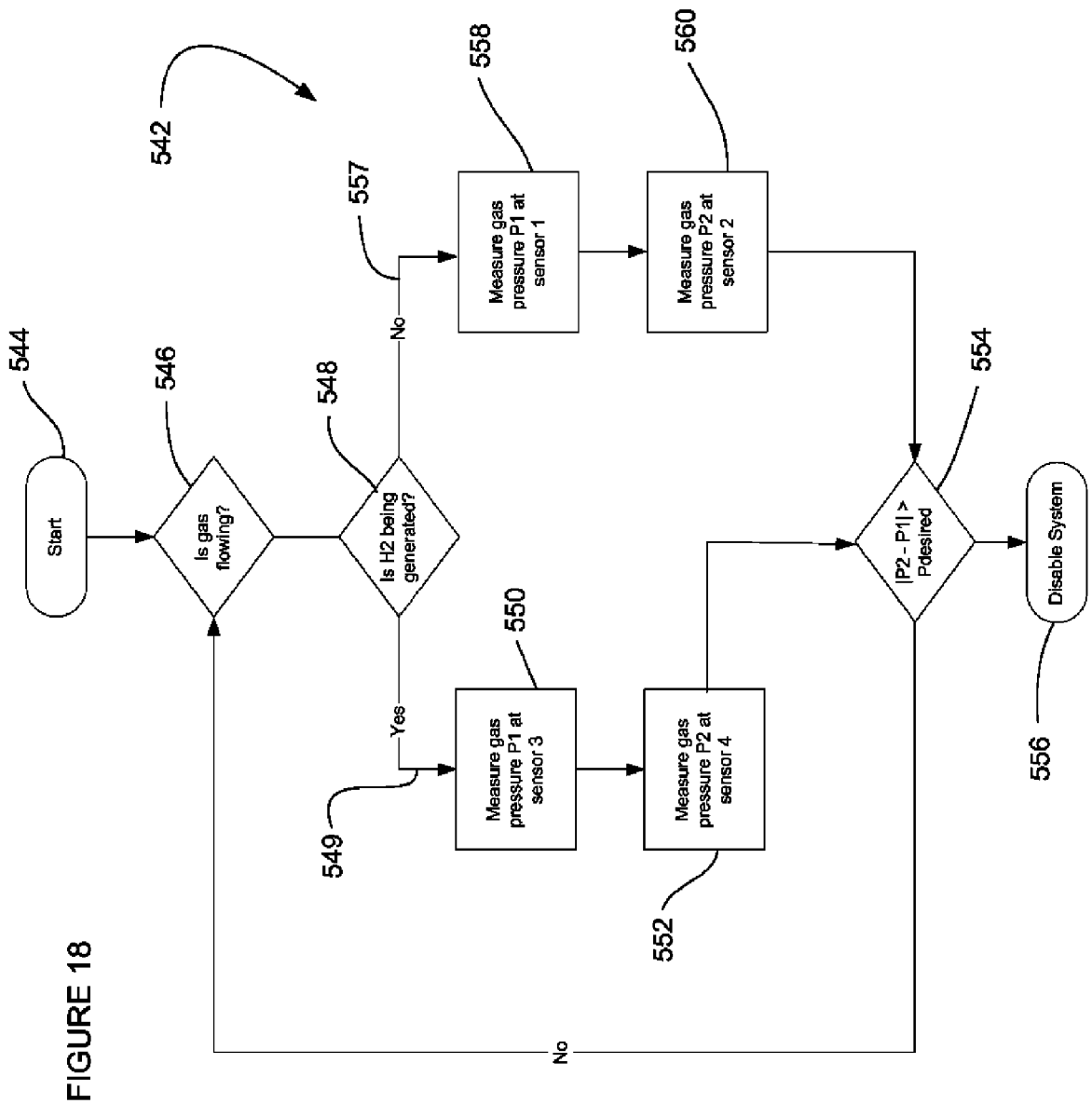
FIG. 18 is a flow diagram of an alternate embodiment method of determining the functionality of a pressure transducer in the regenerative fuel cell system.

An alternate embodiment for determining the health or functionality of the pressure sensors is shown in FIG. 18. In process 542, the controller 114 uses pressure values from pressure sensors 270, 325 in the hydrogen generators 36, 38 and the power generating modules 34 respectively. Process 542 starts at block 544, and proceeds to decision block 546 which determine if gas is flowing in the system, e.g. are the hydrogen generators producing gas, or are the fuel cells using gas. If the hydrogen generators 36, 38 are producing gas, the process proceeds via line 549 to block 550 which measures the gas pressure at sensor 134 followed by the measurement the gas pressure at sensor 270 which is located in the hydrogen generators 36, 38 (FIG. 11). After the pressures are measured, decision block 554 compares the absolute value of the pressure against a predetermined generation value. If the pressure differential is less than the predetermined generation value, the process 542 loops back to start block 544. If the pressure differential is greater that the predetermined generation value, then a potential fault has occurred either in the sensors 134, 270 or in the conduit 54, so the process generates 556 a signal to the system 20 which indicates a potential faulty pressure sensor.

If decision block 546 determines that gas is flowing to the power generation modules 34, the process 542 proceeds via line 557 to block 558 which measures the gas pressure in conduit 58 and block 560 which measures the gas pressure inside the power generation module 34 at pressure transducer 325. After the pressures are measured, decision block 554 compares the absolute value of the pressure against a predetermined usage value. If the pressure differential is less than the predetermined usage value, the process 542 loops back to start block 544. If the pressure differential is greater that the predetermined usage value, then a potential fault has occurred either in the sensors 139, 325 or in the conduit 58, so the process generates 556 a signal to the system 20 which indicates a potential faulty pressure sensor.

While the invention has been described with reference to a preferred embodiment, it will be understood by those skilled in the art that various changes may be made and equivalents many be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment disclosed as the best mode contemplated for carrying out this invention.

Unless the context requires otherwise, throughout the specification and claims which follow, the word "comprise" and variations thereof, such as, "comprises" and "comprising" are to be construed in an open, inclusive sense, that is as "including, but not limited to."

The invention claimed is:

1. A high pressure gas storage system comprising:
   a plurality of storage tank groups fluidly coupled to each other,
   each of said plurality of storage tank groups having at least a first and second gas storage container fluidly coupled together and a valve fluidly coupled to said first and second storage container wherein when said valve is closed, said first and second gas containers are fluidly isolated from said other storage tank groups, wherein said plurality of storage tank groups is further fluidly connected to a pressure regulator by a first conduit; and,
   a pressure transducer coupled to said first conduit between said pressure regulator and said plurality of storage tank groups.

2. The high pressure gas storage system of claim 1 further comprising a first pressure relief valve fluidly coupled between a vent and said plurality of storage tank groups.

3. The high pressure gas storage system of claim 2 further comprising
   a shut off valve fluidly coupled to said pressure regulator by a second conduit; and,
   a pressure vent valve fluidly coupled to said vent and said second conduit between said pressure regulator and said shut off valve.

4. The high pressure gas storage system of claim 3 further comprising a second pressure transducer coupled to said second conduit.

5. The high pressure gas storage system of claim 4 further comprising an input valve fluidly coupled to said first conduit.

6. The high pressure gas storage system of claim 5 further comprising a third pressure transducer coupled to said input valve opposite said third conduit.

7. The high pressure gas storage system of claim 6 further comprising a second pressure relief valve coupled to said shut off valve and said vent.

8. The high pressure gas storage system of claim 7 further comprising a pressure switch fluidly coupled to said shut off valve and said second pressure relief valve.

* * * * *